US007862422B2

(12) United States Patent
Garamendi et al.

(10) Patent No.: US 7,862,422 B2

(45) Date of Patent: Jan. 4, 2011

(54) GAMING DEVICE HAVING A DISPLAY DEVICE HAVING MULTIPLE ROTATABLE MEMBERS

(75) Inventors: Michael T. Garamendi, Reno, NV (US); Stewart Thoeni, Reno, NV (US)

(73) Assignee: IGT, Reno, NV (US)

(*) Notice: Subject to any disclaimer, the term of this patent is extended or adjusted under 35 U.S.C. 154(b) by 1156 days.

(21) Appl. No.: 11/470,167

(22) Filed: Sep. 5, 2006

(65) Prior Publication Data

US 2007/0054727 A1 Mar. 8, 2007

Related U.S. Application Data

(60) Provisional application No. 60/714,885, filed on Sep. 7, 2005.

(51) Int. Cl.
*G06F 17/00* (2006.01)

(52) U.S. Cl. .......................................................... 463/20

(58) Field of Classification Search .............. 463/16–25
See application file for complete search history.

(56) References Cited

U.S. PATENT DOCUMENTS 1,978,395 A 10/1934 Groetchen
2,077,124 A 4/1937 Miller et al.
3,420,525 A 1/1969 Waders
3,642,287 A 2/1972 Lally et al.
3,645,531 A 2/1972 Wright
3,735,987 A 5/1973 Ohki
4,198,052 A 4/1980 Gauselmann
4,326,351 A 4/1982 Heywood et al.
4,346,900 A 8/1982 Lamlee
4,448,419 A 5/1984 Telnaes
4,492,378 A 1/1985 Williams
4,695,053 A 9/1987 Vazquez, Jr. et al.

(Continued)

FOREIGN PATENT DOCUMENTS

DE 19873709026 9/1988

(Continued)

OTHER PUBLICATIONS

Austin Powers in Goldmember™ Advertisement written by IGT, published in 2003.

(Continued)

*Primary Examiner*—Ronald Laneau
(74) *Attorney, Agent, or Firm*—K&L Gates LLP

(57) ABSTRACT

A gaming device including a display device that rotates a co-acting symbol display about a horizontal and vertical axis to display at least one symbol to a player. The symbol display is movably connected to a support and includes a first symbol display and a second symbol display. The first symbol display includes a first wheel and a first reel and the second symbol display includes a second wheel and a second reel. Each of the first and second wheels and reels display a plurality of symbols to the player. A processor causes the symbol display to move to one or more different positions and in one or more different directions to display one or more symbols to a player based on game play, a game function or a game mode in a game displayed by the gaming device.

49 Claims, 10 Drawing Sheets

U.S. PATENT DOCUMENTS 4,826,169 A 5/1989 Bessho et al.
5,152,529 A 10/1992 Okada
5,184,821 A 2/1993 Korenek
5,188,363 A 2/1993 Marnell, II et al.
5,259,616 A 11/1993 Bergmann
5,292,127 A 3/1994 Kelly et al.
5,364,100 A 11/1994 Ludlow et al.
5,395,111 A 3/1995 Inoue
5,536,016 A 7/1996 Thompson
5,553,851 A 9/1996 Malavazos et al.
5,580,309 A 12/1996 Piechowiak et al.
5,584,763 A 12/1996 Kelly et al.
5,584,764 A 12/1996 Inoue
5,639,089 A 6/1997 Matsumoto et al.
5,647,798 A 7/1997 Falciglia
D392,340 S 3/1998 DeSimone
5,752,881 A 5/1998 Inoue
5,755,619 A 5/1998 Matsumoto et al.
5,759,107 A 6/1998 Nagel
5,775,692 A 7/1998 Watts et al.
5,788,573 A 8/1998 Baerlocher et al.
5,848,932 A 12/1998 Adams
5,879,235 A 3/1999 Kaneko et al.
5,882,261 A 3/1999 Adams
5,911,418 A 6/1999 Adams
D412,347 S 7/1999 DeSimone et al.
5,947,820 A 9/1999 Morro et al.
5,951,397 A 9/1999 Dickinson
5,980,384 A 11/1999 Barrie
5,984,782 A 11/1999 Inoue
6,004,207 A 12/1999 Wilson, Jr. et al.
6,015,346 A 1/2000 Bennett
6,027,115 A 2/2000 Griswold et al.
6,033,307 A 3/2000 Vancura
6,039,649 A 3/2000 Schulze
6,039,976 A 3/2000 Mehra et al.
6,059,289 A 5/2000 Vancura
6,059,658 A 5/2000 Mangano et al.
6,082,734 A 7/2000 Uehara et al.
6,086,066 A 7/2000 Takeuchi et al.
6,089,978 A 7/2000 Adams
6,095,921 A 8/2000 Walker et al.
6,102,798 A 8/2000 Bennett
6,105,962 A 8/2000 Malavazos et al.
6,117,009 A 9/2000 Yoseloff
6,142,873 A 11/2000 Weiss et al.
6,149,156 A 11/2000 Faela
6,159,098 A 12/2000 Slomiany et al.
6,162,121 A 12/2000 Morro et al.
6,168,520 B1 1/2001 Baerlocher et al.
6,190,255 B1 2/2001 Thomas et al.
6,217,022 B1 4/2001 Astaneha
6,224,483 B1 5/2001 Mayeroff
6,231,442 B1 5/2001 Mayeroff
6,302,790 B1 10/2001 Brossard
6,309,299 B1 10/2001 Weiss
6,309,300 B1 10/2001 Glavich
6,315,664 B1 11/2001 Baerlocher
6,316,663 B1 11/2001 Sakamoto
6,319,124 B1 11/2001 Baerlocher et al.
6,322,309 B1 11/2001 Thomas et al.
6,334,814 B1 1/2002 Adams
6,336,863 B1 1/2002 Baerlocher et al.
6,343,988 B1 2/2002 Walker et al.
6,364,767 B1 4/2002 Brossard et al.
6,375,187 B1 4/2002 Baerlocher
6,386,974 B1 5/2002 Adams
6,398,220 B1 6/2002 Inoue
6,439,995 B1 8/2002 Hughs-Baird
D462,397 S 9/2002 Baker et al.
6,464,582 B1 10/2002 Baerlocher et al.
6,506,117 B2 1/2003 DeMar et al.
6,506,118 B1 1/2003 Baerlocher et al.
D473,270 S 4/2003 Seelig et al.
6,572,473 B1 6/2003 Baerlocher
6,589,114 B2 7/2003 Rose
6,659,864 B2 12/2003 McGahn et al.
6,663,488 B1 12/2003 Adams
6,676,512 B2 1/2004 Fong et al.
D486,869 S 2/2004 Webb et al.
D487,582 S 3/2004 McGahn et al.
6,705,944 B2 3/2004 Luciano
6,715,756 B2 4/2004 Inoue
6,726,204 B2 4/2004 Inoue
6,726,563 B1 4/2004 Baerlocher et al.
6,793,577 B1 9/2004 Wilkins et al.
D496,968 S 10/2004 Baerlocher
6,855,052 B2 2/2005 Weiss et al.
D503,751 S 4/2005 Kaminkow et al.
D503,951 S 4/2005 Karstens
6,899,625 B2 5/2005 Luciano, Jr. et al.
7,306,520 B2 * 12/2007 Kaminkow et al. ........... 463/20
2002/0072402 A1 6/2002 Baerlocher
2002/0142822 A1 10/2002 Baerlocher et al.
2002/0183109 A1 12/2002 McGahn et al.
2003/0027623 A1 2/2003 Rose et al.
2003/0040355 A1 * 2/2003 Baerlocher .................. 463/20
2003/0040360 A1 2/2003 Kaminkow
2003/0060277 A1 3/2003 Webb et al.
2003/0064796 A1 * 4/2003 Glavich et al. ................ 463/25
2003/0078093 A1 4/2003 Simms
2003/0078096 A1 4/2003 Kaminkow
2003/0119583 A1 6/2003 Kaminkow et al.
2003/0162578 A1 8/2003 Baerlocher et al.
2003/0162579 A1 8/2003 Gauselmann
2003/0162584 A1 8/2003 Hugh-Baird
2003/0190957 A1 10/2003 Tanskanen
2003/0195027 A1 10/2003 Baerlocher et al.
2004/0000754 A1 1/2004 Inoue
2004/0002372 A1 1/2004 Rodgers et al.
2004/0009807 A1 1/2004 Miller et al.
2004/0012145 A1 1/2004 Inoue
2004/0014516 A1 1/2004 Inoue
2004/0014517 A1 * 1/2004 Inoue .......................... 463/20
2004/0017041 A1 1/2004 Inoue
2004/0018866 A1 * 1/2004 Inoue .......................... 463/16
2004/0026854 A1 2/2004 Inoue
2004/0036218 A1 2/2004 Inoue
2004/0038726 A1 2/2004 Inoue
2004/0048645 A1 3/2004 Webb et al.
2004/0053660 A1 3/2004 Webb et al.
2004/0053665 A1 3/2004 Baerlocher
2004/0053671 A1 3/2004 Nordman
2004/0082378 A1 4/2004 Peterson et al.
2004/0102237 A1 5/2004 Baerlocher
2004/0121838 A1 6/2004 Hughs-Baird et al.
2004/0147306 A1 7/2004 Randall et al.
2004/0150161 A1 8/2004 Inoue
2004/0155399 A1 8/2004 Inoue
2004/0183251 A1 9/2004 Inoue
2004/0248640 A1 12/2004 Kaminkow et al.
2005/0026678 A1 2/2005 Kaminkow
2008/0146331 A1 * 6/2008 Nordman et al. .............. 463/31

FOREIGN PATENT DOCUMENTS

EP 1 184 822 3/2002
EP 1 465 126 10/2004
EP 1 515 285 3/2005
EP 1 653 416 5/2006
GB 2 062 922 A 5/1981
GB 2 090 690 7/1982
GB 2 096 376 10/1982
GB 2 097 160 10/1982

| | | |
|---|---|---|
| GB | 2 100 905 | 1/1983 |
| GB | 2 105 891 | 3/1983 |
| GB | 2 117 155 | 10/1983 |
| GB | 2 137 392 | 10/1984 |
| GB | 2 161 008 | 1/1986 |
| GB | 2 170 636 | 8/1986 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 242 300 | 9/1991 |
| GB | 2 262 642 | 6/1993 |
| GB | 2268415 | 1/1994 |
| GB | 2 322 217 | 12/1997 |
| GB | 2 201 821 | 9/1998 |
| WO | WO 00/12186 | 3/2000 |
| WO | WO 00/32286 | 6/2000 |

OTHER PUBLICATIONS

Barn Yard Advertisement written by Aristocrat, available prior to Jun. 9, 2003.
Barn Yard Article written by Strictly Slots, published in Mar. 2002.
Description of Let's Make a Deal Television Show written by letsmakeadeal.com (2 pages), printed on Mar. 16, 2001.
Easy Street Advertisements and Articles written by Casino Data Systems, published in 2000.
Gold Fever Advertisement written by Atronic Casino Technology, Ltd., published 1999.
Gold Fever Atronic Web Page written by Atronic Casino Technology, Ltd., dated Mar. 2002.
Jewel in the Crown Advertisement written by IGT, published in 1999.
Jewel in the Crown Advertisements written by Barcrest Ltd., published 1999.
Let's Make a Deal Game Advertisement written by Bally Gaming Systems, not dated.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Let's Make a Deal written by Illinoislottery.com (1 page), printed on Mar. 21, 2001.
Marshall Fey, Slot Machines a pictorial History of the First 100 Years, Fifth Edition.
Take Your Pick Article and Brochure, written by Strictly Slots, IGT/Anchor Games, published in 1999.
The Deals of Let's Make a Deal written by fortunecity.com (2 pages), printed on Jul. 20, 2004.
The Official Let's Make a Deal Website written by Bally Gaming System Website, printed on Mar. 16, 2001.
Top Dollar Brochure, written by IGT, published in 1998.
Wheel of Fortune Brochure, written by IGT, published in 1998.
Wheel of Fortune Brochure, written by IGT, published in 1999.

* cited by examiner

GAMING DEVICE HAVING A DISPLAY DEVICE HAVING MULTIPLE ROTATABLE MEMBERS

PRIORITY CLAIM

This application is a non-provisional application of, claims priority to and the benefit of U.S. Provisional Patent Application Ser. No. 60/714,885, filed on Sep. 7, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment, entertainment and excitement as possible. Providing interesting and exciting primary games and secondary games in which a player has an opportunity to win potentially large awards or credits is one way to enhance player enjoyment and excitement. Another way to enhance a player's enjoyment, entertainment and excitement with a gaming device is by including lights, sounds or other visual or audio or audio-visual effects in the gaming machines.

Certain known gaming devices use mechanical devices such as reels, wheels and light displays to enhance the attraction of the machines to players and also to enhance the player's game playing experience. These mechanical devices enable a player to see physical movements of a game, a portion of a game, or a functional game event or element which increases the player's enjoyment of the game.

Therefore, to increase player enjoyment and excitement with gaming devices, it is desirable to provide new and different mechanical display devices in conjunction with wagering gaming devices.

SUMMARY

One embodiment of the present disclosure is directed to a gaming device including a mechanical display device and specifically to a gaming device including a display device having multiple individually operable and coacting rotatable members that are each operable to display at least one and preferably a plurality of different symbols in a plurality of different planes.

In one embodiment, the display device is mounted to or supported by the cabinet of a gaming device or machine. In alternative embodiments, the display device may be positioned in association with one or more gaming devices or machines or a bank of gaming devices or machines. One embodiment of the display device includes co-acting symbol displays including a first symbol display and a second symbol display which are substantially aligned and rotatable about a same axis or substantially the same axes. The symbols on the displays may include values, awards or any other suitable characters or images. In one embodiment, the display device is associated with a base or primary game and is activated upon the occurrence of a triggering event in or associated with the primary game. In another embodiment, the display device is associated with a secondary or bonus game and is activated upon the occurrence of a triggering event, such as a triggering event, in a primary game. In other embodiments, the display device is activated upon an occurrence of a triggering condition not directly associated with the play of a primary game or secondary game, such as being a mystery trigger. In other alternative embodiments, the display device is employed to provide different games at different times or different games with different symbols at different times. The display device may be activated or employed in any other suitable manner in connection with one or a plurality of gaming machines. In various embodiments, the symbol display creates a visually appealing and attractive display for players which attracts players to the gaming device(s) and increases a player's excitement and enjoyment with the associated gaming device(s).

In one embodiment, the display device includes a first symbol display and a second symbol display which are each suitably connected to a support. In one embodiment, the first and second symbol displays each include a front surface or portion and a side surface or portion which extends transversely from the edge of the front surface. In one embodiment, the front surface of the first symbol display defines or includes a first wheel or first wheel portion, the side surface of the first symbol display defines or includes a first reel or first reel portion, the front surface of the second symbol display defines or includes a second wheel or second wheel portion, and the side surface of the second symbol display defines or includes a second reel or second reel portion. In one embodiment, the first and second symbol displays are mounted in alignment and in an opposing relationship such that the front surfaces face in opposite directions and the side surfaces are substantially aligned such as in the same plane or having the same or substantially the same circumference. Accordingly, the display device provides two opposing wheels or wheel portions and two aligned reels or reel portions. It should be appreciated that in alternative embodiments, one or more additional reels may be positioned between the first display and second display to provide three or more aligned reels. The first and second wheels each move or rotate in a clockwise direction, a counterclockwise direction or sequentially in any suitable combination of directions. The first and second reels each correspondingly and respectively move with the movement of the first and second wheels. Any intermediate reels may move independently. Thus, in various embodiments, the reels can function as one or more conventional reels in a slot game.

In one embodiment, each of the first and second wheels or wheel portions and the first and second reels or reel portions include a plurality of sections. In one embodiment, each of the sections of the first and second wheels are selected from a first plurality of symbols and each of the sections of the first and second reels include at least one symbol selected from a second preferably different plurality of symbols. The symbols may be conventional wheel symbols, reel symbols, letters, numbers, characters or any suitable image or images. In one embodiment, at least one of the symbols on at least one of the first wheel and the second wheel are different. In another embodiment, a plurality of the symbols on the first wheel, the second wheel, the first reel and the second reel are different. It should be thus appreciated that one or more of the symbols on each of the first wheel, the second wheel, the first reel and the second reel may be different symbols. It should also be appreciated that two or more of these symbols may be the same or identical. It should further be appreciated that while two of the symbols may be identical or the same, on different wheels and reels such symbols may have the same or a different functionality.

In one embodiment, the support includes a first or inner support, a second or outer support and a base. The symbol displays are each movably connected to the inner support, the inner support is movably connected to the outer support, and the outer support is movably connected to the base. The base is connected to the cabinet of the gaming device or machine or to another support associated with one or more gaming devices or machines.

In one embodiment, a first actuator or motor is mounted within the base and is connected or coupled to the outer support by an actuator arm or axle. Upon activation, the first motor causes the outer support to rotate about an axis defined by the actuator arm or axle. In one embodiment, this is a substantially vertically extending axis. A second actuator or motor is connected to the inner support. Upon activation, the second motor causes the inner support to rotate about a different axis. In one embodiment, this is a substantially horizontal axis. In one embodiment, this motor is mounted between the symbol displays. In one embodiment, one or more third actuators or motors such as display motors are positioned between and respectively connected to each of the first symbol display and the second symbol display to rotate the first and second wheels/reels of the first and second symbol displays. In one embodiment, a separate actuator or display motor is connected to each of the first and second symbol displays to respectively cause the first and second wheels/reels to rotate. It should be appreciated that any suitable motor, motors or other actuators may be employed to rotate or move the first and second symbol displays and the first and second wheels/reels of the first and second symbol displays. In one embodiment, electrical power and electrical signals are transferred from the gaming device cabinet to each of the motors using suitable electrical connectors such as slip rings. It should be appreciated that any suitable electrical connector or connectors may be employed to transfer electrical power and signals from the gaming device cabinet to one or more of the motors or other actuators. It should also be appreciated that other suitable sources for electrical power and signals (i.e., control of the display device) can be implemented.

In one embodiment, the outer support includes an axle or actuator arm which is movably connected to the base. As described above, the first motor is suitably connected to or coupled to the axle or actuator arm and is concealed or enclosed within the base. The first motor causes the axle or actuator arm of the outer support to move or rotate in a clockwise direction, a counterclockwise direction or any suitable sequential combination of directions. In one embodiment, a first slip ring is connected between the first motor and the axle or actuator arm of the outer support to transfer electrical power and electrical signals to the motor(s) coupled to the symbol displays and any other actuators or motors associated with the display device.

In one embodiment, the inner and outer supports are concentric or concentrically circular rings suitably connected together. In one embodiment, two axles extend from opposing sides of the inner support and are positioned in corresponding openings defined by the outer support. The axles are movable within the openings of the outer support to enable the inner support to rotate about a different axis relative to the outer support. In one embodiment, a second slip ring is connected to at least one of the axles to transfer electrical power and/or electrical signals to the inner support. The inner and outer supports can therefore each independently move or rotate about a separate different axis and in different directions. It should be appreciated that the inner and outer supports may move or rotate at the same time or at different times. Moreover, the inner and outer supports may rotate at the same rates of speed, at different rates of speed or at the same or different variable rates of speed.

In one embodiment, the first symbol display and the second symbol display which are connected to opposing sides of the inner support form at least one receptacle, cavity or housing which houses and conceals the electrical components which control the first and second symbol displays and in one embodiment the inner support. In one embodiment, at least one actuator is concealed within the receptacle, cavity or housing formed by the first and second symbol displays and is connected to each of the first and second symbol displays. As described above, such motors cause the first and second wheels of the first and second symbol displays to move or rotate and therefore causes the first and second reels to move or rotate in accordance with an attract mode, a game event, game function or game mode associated with a game displayed by the gaming device. In an alternative embodiment, at least one actuator or motor is connected to the first symbol display and at least one actuator or motor is connected to the second symbol display to cause each of the first and second symbol displays to move or rotate. It should be appreciated that any suitable number of actuators or motors may be connected to the first and/or second symbol displays.

In one embodiment, an indicator is connected to the inner support and is positioned to indicate at least one of the symbols on the first wheel and reel and the second wheel and reel. In another embodiment, a plurality of indicators are connected to the inner support and indicate at least one of the symbols on the first wheel and reel and the second wheel and reel. In alternative embodiments, the indicators are positioned in alternative locations. In a further embodiment, at least one light or light source is positioned within the receptacle formed by the first and second symbol displays and illuminates at least one of the sections of the first wheel and reel and the second wheel and reel to indicate at least one of the symbols on the first wheel and reel and the second wheel and reel. It should be appreciated that any suitable number of lights or other suitable illumination devices may be used to illuminate and indicate symbols on the first wheel and reel and the second wheel and reel. It should also be appreciated that any suitable number of indicators may be connected to the inner support to indicate symbols on the first wheel and reel and the second wheel and reel.

In operation, the display device is controlled by a processor which causes the display device to move and indicate at least one symbol to a player in conjunction with a play of a game, an event in a game, a mode in a game or any other suitable function of a game. The game may be a primary game, a secondary game, or a combination thereof. The display device may also function in an attract mode, outside of a play of a primary game or secondary game (such as to provide a mystery award) or in any other suitable mode. The processor can be in the cabinet of the gaming machine or remote from the gaming machine.

In one embodiment, the processor causes the inner and outer supports of the support to move about the first axis and second axis, respectively, which causes the co-acting symbol display to move in accordance with the inner and outer supports. The co-acting symbol display can therefore be moved in a number of different directions and to a number of different orientations or positions to display or indicate one or more symbols. This enhances the visual appearance or attractiveness of the gaming device and also increases a player's excitement and enjoyment of a game displayed by the gaming device.

In one alternative embodiment, an actuator is rotatably coupled to an outer ring or support. The actuator is capable of accelerating, decelerating, reversing, or stopping the rotation of the outer support about a first axis. The outer support is rotatably coupled to an inner ring or support along a second axis, which is perpendicular to the first axis. The outer and inner supports are rotatably coupled by a second actuator, at least one axel, at least one brace, at least one bracket, and at least one slip ring. The second actuator is capable of accelerating, decelerating, reversing, or stopping the rotation of the inner support about the second axis.

The inner support is coupled to two display members. Both display members include a wheel hub. Wheels are attached to the wheel hubs opposite the inner ring. Reels are attached to the wheel hubs. Additional actuators are positioned between the first wheel hub and the inner support and between the second wheel hub and the inner support. The additional actuators are capable of independently or dependently accelerating, decelerating, reversing, or stopping the rotation of the first and second display members about a third axis which is perpendicular to both the first axis and the second axis.

It is therefore an advantage of the present disclosure to provide a gaming device having a display device which moves to several different positions to display symbols.

Another advantage of the present disclosure is to provide a gaming device having a gyroscopic type display device which moves multiple symbol displays to a number of different positions to indicate at least one symbol.

A further advantage of the present disclosure to provide a gaming device having multiple rotating members which enhances the visual appearance and enjoyment of a gaming device.

Additional features and advantages of the present invention are described in, and will be apparent from, the following Detailed Description and the figures.

DETAILED DESCRIPTION

Figure 1:
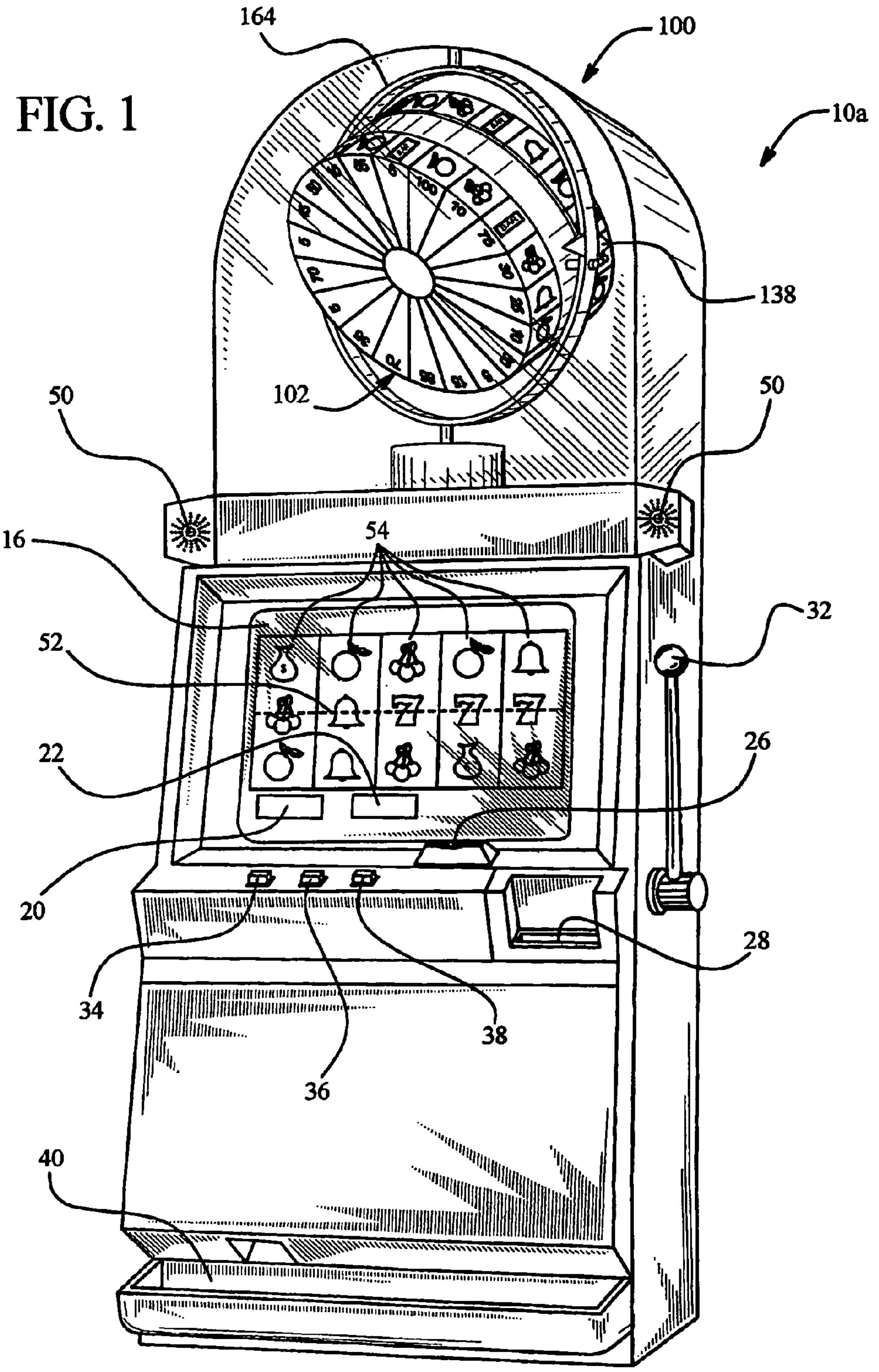
FIG. 1 is a front perspective view of one embodiment of the gaming device of the present disclosure.

Referring now to the drawings, an embodiment of the gaming device of the present disclosure is illustrated in FIG. 1 as gaming device 10*a*. In the embodiment illustrated in FIG. 1, gaming device 10*a* has a support structure, housing or cabinet which provides support for a plurality of displays, inputs, controls and other features of a conventional gaming machine. It is configured so that a player can operate it while standing or sitting. The gaming device may be positioned on a base or stand which a player can operate preferably while sitting. The gaming device may have varying cabinet and display configurations.

Figure 2A:
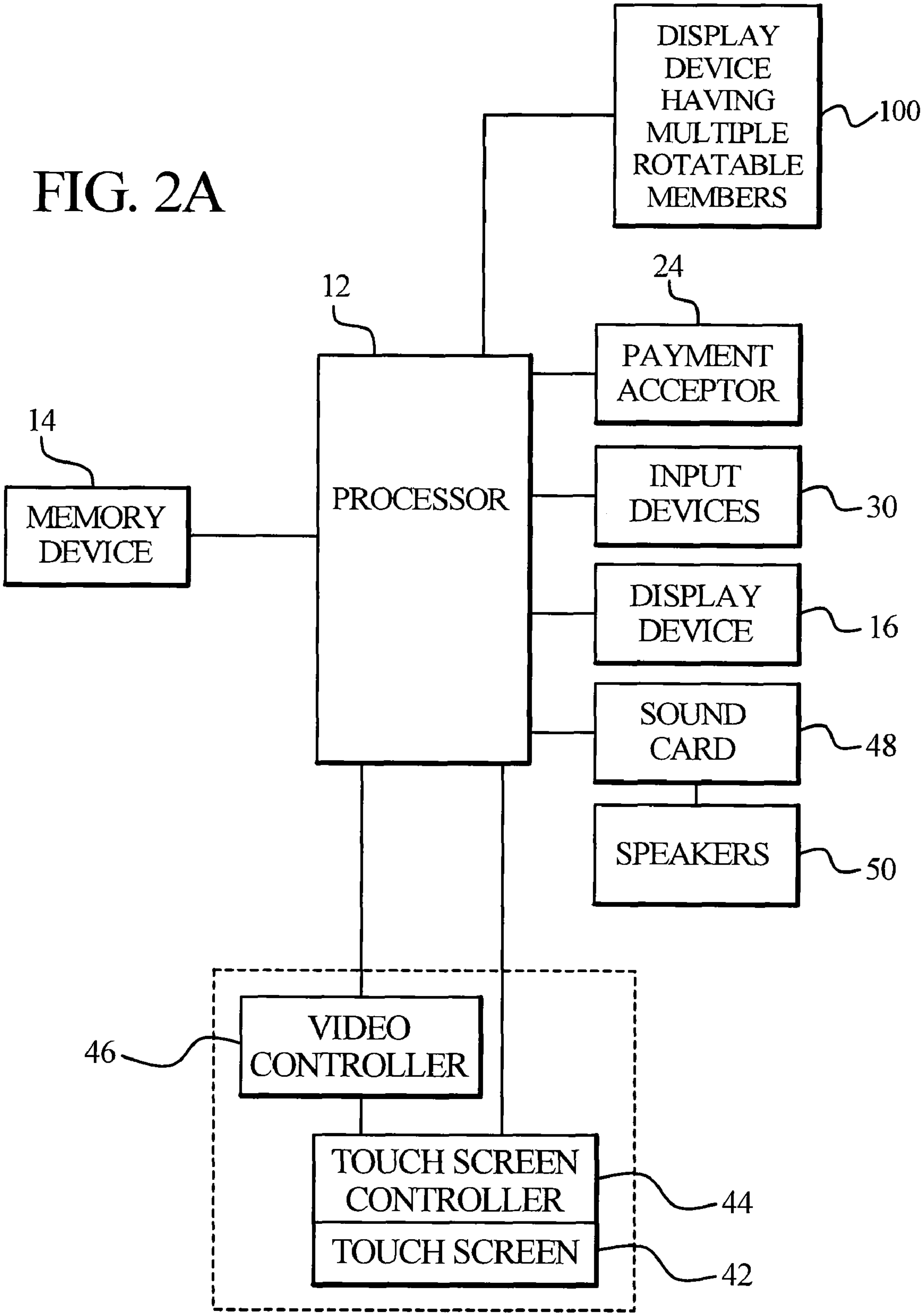
FIG. 2A is a schematic block diagram of the electronic configuration of one embodiment of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device of the present invention.

In one embodiment, part or all of the program code and/or operating data described above can be stored in a detachable or removable memory device, including, but not limited to, a suitable cartridge, disk or CD ROM. The processor and memory or storage device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1 includes a central display device 16 which displays a primary game. This display device may also display any secondary game associated with the primary game as well as information relating to the primary or secondary game. The embodiment shown in FIG. 1 includes a central display device 16 and an upper display device or gyroscopic display device 100. As seen in FIG. 1, in one embodiment, the gaming device includes a credit display 20 which displays a player's current number of credits, cash, account balance or the equivalent. In one embodiment, gaming device includes a bet display 22 which displays a player's amount wagered.

The display device 16 may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display device 16 of the gaming device is configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1 and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIG. 1, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10*a* can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIG. 1, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIG. 1. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
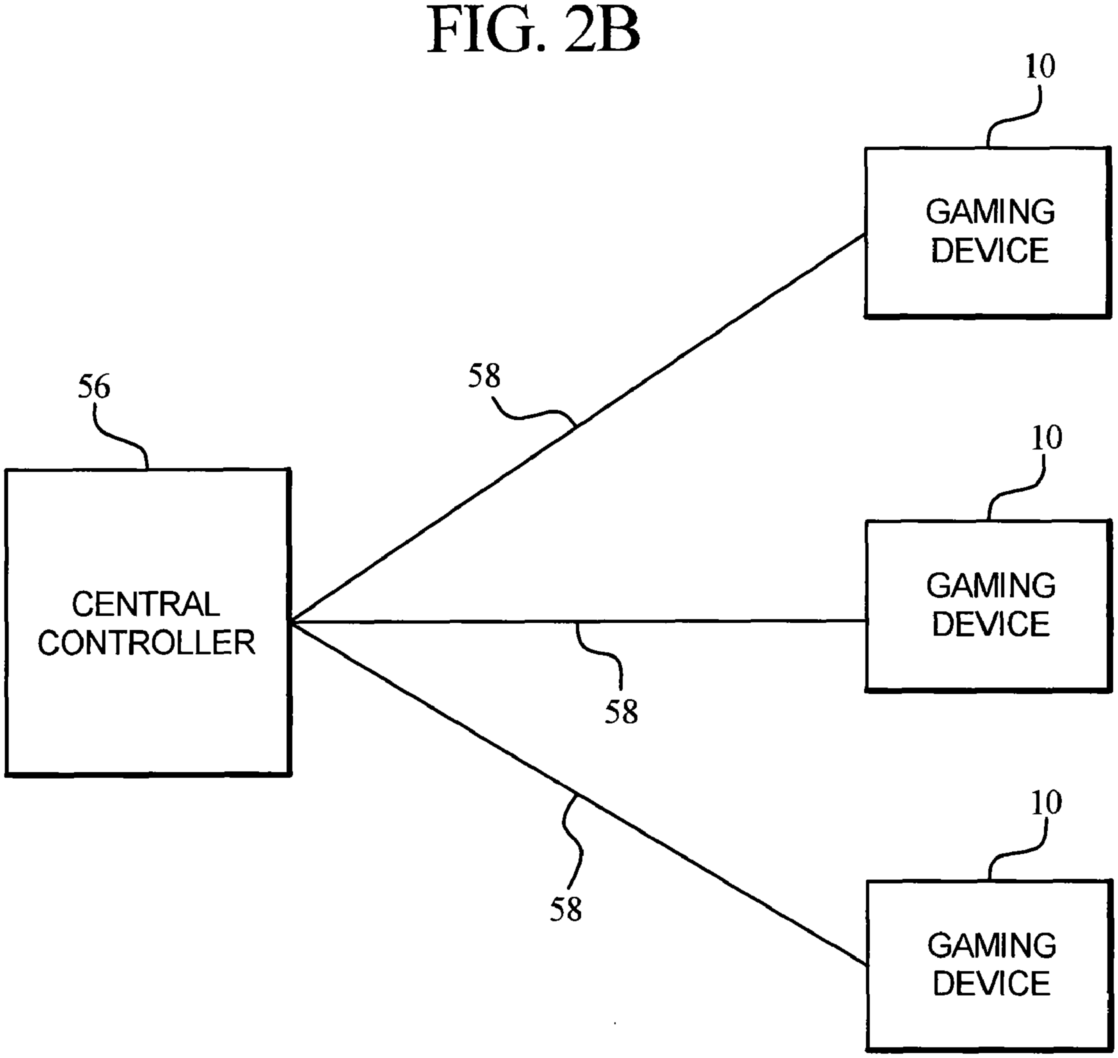
FIG. 2B is a schematic block diagram illustrating a plurality of gaming terminals and communication with a central controller.

In one embodiment, as illustrated in FIG. 2B, one or more of the gaming devices 10*a* of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Display Device Having Multiple Rotatable Symbol Displays

One embodiment disclosed herein is directed to a gaming device having a game including a display device having multiple movable or rotatable members or symbol display which move or rotate in a plurality of different directions to display symbols and determine an outcome to provide to a player based on the indicated symbols on the symbol display(s).

Figure 3:
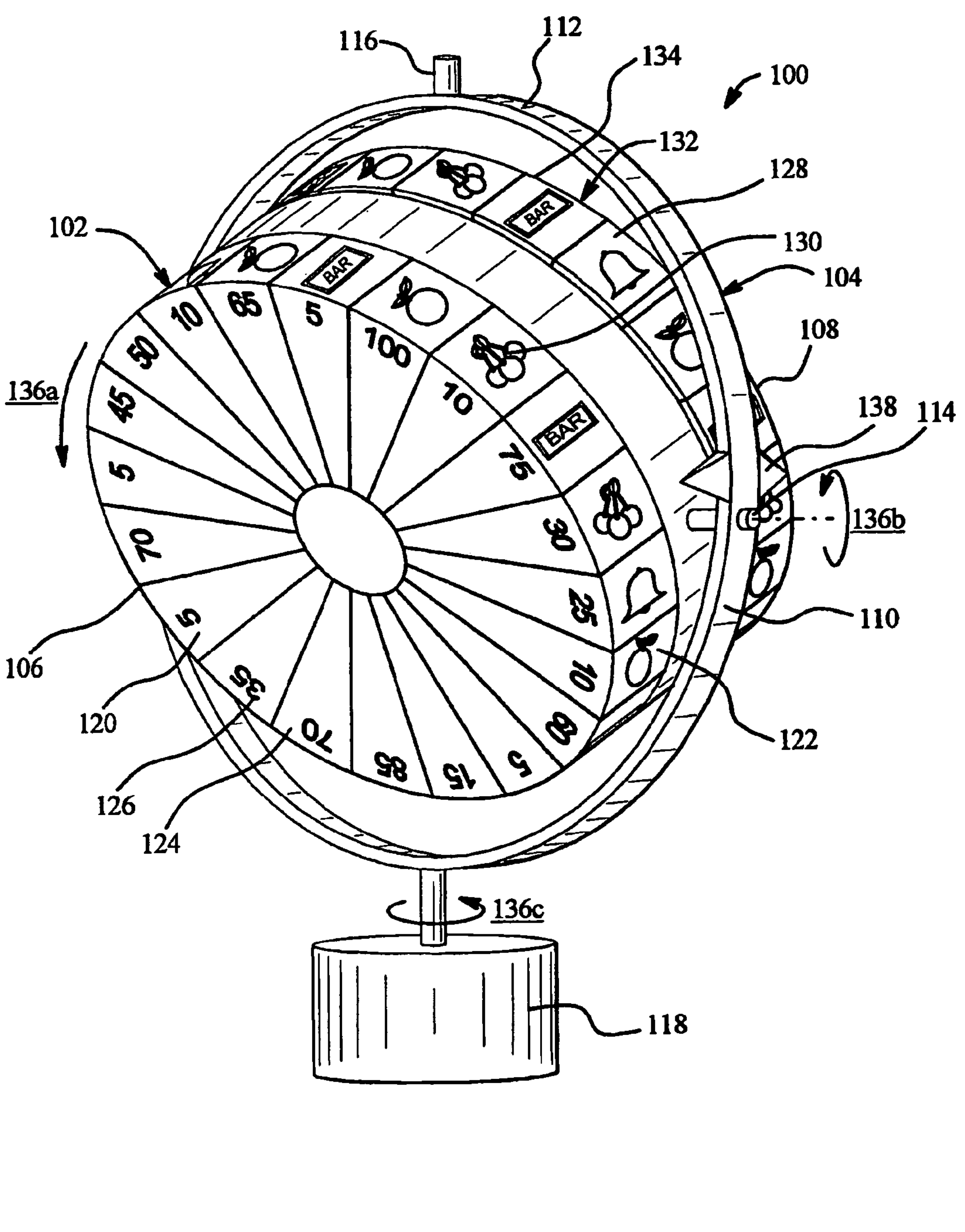
FIG. 3 is a perspective view of one embodiment of the display device of the present disclosure.
Figure 4:
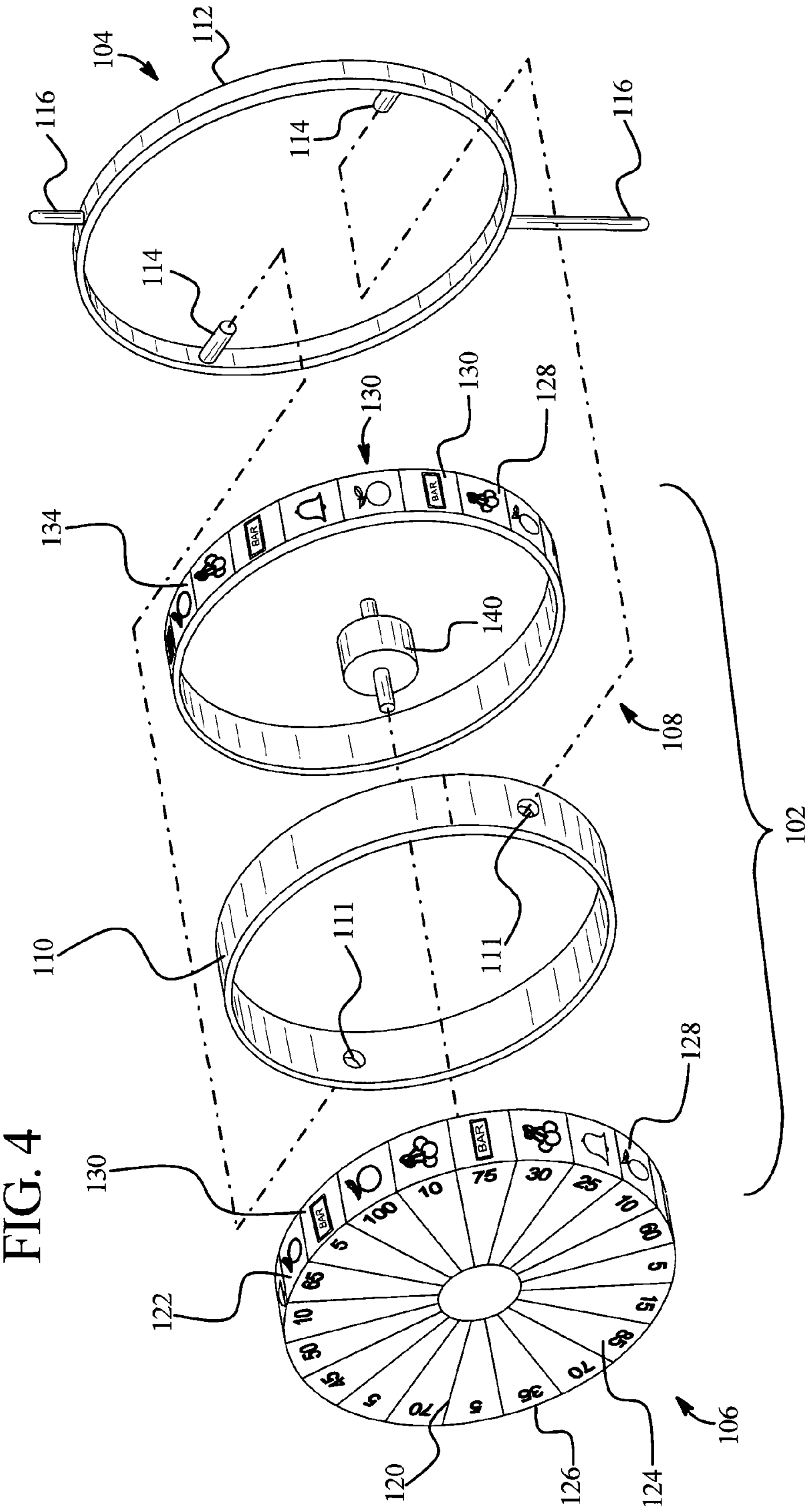
FIG. 4 is an exploded perspective view of the display device of FIG. 3.

Referring now to FIGS. 1, 3 and 4, in one embodiment, the gaming device includes a display device 100 mounted on the top of the gaming device cabinet and which includes multiple rotating or rotatable members or symbol displays for displaying symbols such as award values and reel symbols. In the illustrated embodiment, the display device is movable or rotatable in a clockwise or counterclockwise direction about a first axis extending substantially perpendicular to the front of the display device as indicated by arrow 136*a*. The display device is also movable or rotatable in a clockwise or counterclockwise direction about a second substantially horizontal axis as indicated by arrow 136*b*. The display device is also movable or rotatable in a clockwise or counterclockwise direction about a third substantially vertical axis as indicated by arrow 136*c*. It should be appreciated that the display device 100 can move or rotate in any suitable direction or any suitable combination of directions. It should also be appreciated that the movement or rotation of display device 100 can be accelerated, decelerated, stopped or reversed in any of the first, second or third axes independently or uniformly.

In the illustrated embodiment, the display device 100 includes a combined symbol display 102 which is movably connected to a support 104. The combined symbol display 102 includes a first symbol display 106 and a second symbol display 108 supported by the support 104. In the illustrated embodiment, each of the first and second symbol displays 106 and 108 are generally cylindrical in shape and include a substantially flat or planer front surface and a side surface extending from the front surface. It should be appreciated that the first and second symbol displays and or surfaces of the symbol displays may be any suitable size, shape or configuration.

In this illustrated embodiment, the front surface of the first symbol display 106 includes a wheel or wheel portion such as first wheel 120 including a plurality of wheel sections 124. As shown in FIGS. 3 and 4, the wheel sections 124 are generally pie-shaped sections. It should be appreciated that the first wheel 120 may include any suitable number of sections and the sections may be any suitable size or shape. A plurality of wheel symbols 126 are displayed by the wheel sections 124. In FIG. 3, the wheel symbols 126 include numbers or values representing awards adapted to be provided to players. Alternatively, the wheel symbols may be numbers, letters, characters or any suitable image or images. As mentioned above, the side surface or edge surface of the first symbol display 106 extends substantially perpendicular to the front surface and includes a reel or reel portion such as first reel 122. The first reel 122 includes a plurality of reel sections 128. Each of the reel sections include one or more reel symbols 130. As shown in FIG. 3, in one embodiment, the reel symbols include conventional reel symbols such as a cherry symbol, a bar symbol, an orange symbol and a bell symbol. It should be appreciated that the reels symbols may include numbers, letters, characters, or any suitable image or images. Also, as illustrated, the number of reel sections 128 can be equivalent to the number of wheel sections 124. However, it should be appreciated that the number of reel sections 128 can differ from the number of wheel sections 124. Further, as illustrated, the reel sections 128 can be aligned with the wheel sections 124 such that the border between two reel sections 128 and the border between two wheel sections 124 form a plane. However, it should be appreciated that the reel sections 128 and the wheel sections 124 can be aligned relative to each other in any suitable manner.

In the illustrated embodiment, the second symbol display 108 is identical in shape and size to the first symbol display 106 and includes a second wheel or wheel portion 132 included on the front surface of the second symbol display 108 and a second reel or reel portion 134 included on the side surface of the second symbol display 108, which transversely extends from the outer edge of the front surface. The second wheel 132 includes a plurality of the wheel sections, each displaying one or more of the wheel symbols. In one embodiment, one wheel has one, more or all higher values or higher average values than the other wheel. In various alternative embodiments:

(a) at least one of the wheel symbols displayed by the first wheel 120 is different from the wheel symbols displayed by the second wheel 132;
(b) a plurality of the wheel symbols displayed by the first wheel 120 are different from the wheel symbols displayed by the second wheel 132;
(c) all of the wheel symbols displayed by the first wheel 120 are different from the plurality of wheel symbols displayed by the second wheel 132;
(d) at least one of the wheel symbols displayed by the first wheel 120 is the same as the wheel symbols displayed by the second wheel 132;
(e) a plurality of the wheel symbols displayed by the first wheel 120 are the same as the wheel symbols displayed by the second wheel 132; and
(f) all of the wheel symbols displayed by the first wheel 120 are the same as the plurality of wheel symbols displayed by the second wheel 132.

The second reel 134 includes a plurality of reel sections 128. One or more of the plurality of the reel symbols 130 are displayed by each of the reel sections 128. As described above, the reel symbols may be any suitable symbols. In various alternative embodiments:

(a) at least one of the reel symbols displayed by the first reel 122 is different than the reel symbols displayed by the second reel 134;
(b) a plurality of the reel symbols displayed by the first reel 122 are different than the reel symbols displayed by the second reel 134;
(c) all of the reels symbols displayed by the first reel 122 are different than the reel symbols displayed by the second reel 134;
(d) at least one of the reel symbols displayed by the first reel 122 is the same as the reel symbols displayed by the second reel 134;
(e) a plurality of the reel symbols displayed by the first reel 122 are the same as the reel symbols displayed by the second reel 134; and
(f) all of the reels symbols displayed by the first reel 122 are the same as the reel symbols displayed by the second reel 134.

Furthermore, it should be appreciated that at least one, a plurality or all of the reel symbols displayed by the first and second reels may be the same or different than the wheel symbols displayed by the first and second wheels.

The first and second symbol displays are connected to a first or inner support of the support 110. In the illustrated embodiment, the first and second symbol displays, as assembled, form an internal receptacle, cavity or area for housing, supporting and concealing the drive mechanism (i.e., actuator(s) or motor(s)) for the first and second symbol displays, possibly the inner support 110, and other mechanical components, electronic components and wiring to operate the first and second symbol displays. In the illustrated embodiment, at least one actuator such as display motor 140 (generally illustrated in FIG. 4), which may be any suitable actuator or motor, is positioned within the receptacle formed by the first and second symbol displays. This display motor 140 is connected to the first and second symbol displays 106 and 108 to move or rotate each of the symbol displays. Alternatively, two or more display motors may be employed to rotate the first and second symbol displays. The display motor(s) are activated to cause one or both of the first and second wheels and reels to move in one or more directions such as in a clockwise or counterclockwise direction. The first and second wheels and reels may be moved or rotated in any suitable direction or directions. It should be appreciated that the first and second wheels and reels may be moved at the same time or at different times. Furthermore, the first and second wheels and reels may be moved at the same rotational rate or at different rotational rates.

In the illustrated embodiment, the frame or support 104 includes a first ring, a first member or inner support 110 and a second ring, second member or outer support 112. The first and second rings are concentrically arranged and the first ring is movably connected to the second ring so that the first and second rings can move or rotate independently of each other about an axis as generally shown in FIG. 3. In one embodiment, the first ring 110 is positioned adjacent to the first and second symbol displays 106 and 108 and supports each of the first and second symbol displays.

In one embodiment, the first ring 110 of support 104 includes two arms or axles 114 which extend inwardly from opposite or opposing sides of the first ring. The axles 114 are connected to the first ring 110 and support the first ring 110 and the symbol displays with respect to the second ring 112. In the illustrated embodiment, the axles 114 have a suitable size and shape which corresponds to the size and shape of openings 111 defined on opposite or opposing sides of the second ring 112 so that the axles 114 can be inserted into and at least partially extend through the openings 111. The engagement between the axles 114 and the openings 111 is such that the axles 114 can freely move or rotate within the openings 111. In one embodiment, at least one slip ring (not shown) is connected between at least one of the axles and the first rotating member or first ring to transfer electrical power and/or electrical signals to the motor or motors controlling the movement of the first and second display members. It should be appreciated that any suitable slip ring or slip rings or any suitable electrical connectors may be used to transfer the electrical power and/or electrical signals. In an alternative embodiment, one axle (not shown) extending from one side to the other side is employed.

In one embodiment, at least one actuator or motor is supported by and concealed within the receptacle or cavity formed by the first and second symbol displays and is connected to one or both of the axles 114 (or in the alternative embodiment to the single axle). Alternatively, a motor may be connected to the end of at least one of the axles (or in the alternative embodiment to the single axle) which is outside of the cavity or receptacle formed by the first and second symbol displays. The motor may be any suitable motor or actuator and is operable to move or rotate the axles 114 about a horizontal axis as indicated by arrow **136*b*. The motor may rotate the axles 114 and thereby the symbol display 102 in a clockwise direction, a counter clockwise direction or any combination of clockwise and counter clockwise directions about the horizontal axis. In another embodiment, at least one motor is connected to each of the axles 114 as described above to further facilitate the movement or rotation of the symbol display 102**.

The second ring 112 of the support 104 is connected to a vertical axle or support member 116. In the illustrated embodiment, the axle 116 is divided into two sections. One of the sections is connected to the second ring and is also movably connected to base 118. A second slip ring or electrical connector (not shown) is connected between the axle 116 and the base to transfer electrical power and/or electrical signals. The base 118 is connected or attached to the top of the cabinet of the gaming device **10*a* as indicated above. The other section of the axle 116 is connected to the opposite or opposing side of the second ring as shown in FIG. 3. In one embodiment, this section of axle 116 is connected to a suitable motor, actuator or other drive mechanism, which is positioned within a housing or enclosure such as a top box or platform. In one embodiment, the motor is activated to move or rotate the axle 116 and thereby move or rotate the second ring 112 about a vertical axis as indicated by arrow 136*c*. The movement of the second ring 112 also moves or rotates the first ring 110 and the symbol display 102 about the vertical axis. It should be appreciated that the second ring 112** may move or rotate about the vertical axis in a clockwise direction, a counter clockwise direction or in any suitable combination of clockwise and counter clockwise directions. It should also be appreciated that the motor can cause the second ring to move at any suitable rotational rate or rates about the vertical axis.

In one embodiment, the support 104 is made with a durable material such as any suitable steel, stainless steel or the like. In one embodiment, all motor operation is controlled by a secondary motor control system which is in communication with the processor. The electrical connections between the various components of the display device are completed using a suitable wires. The slip rings are used for transferring the electrical power or signals between moving parts. It should be appreciated that any suitable wiring or electrical connections may be used in the display device to transfer electrical power and/or electrical signals.

In one embodiment, an indicator or pointer 138 is connected to the outer ring or second ring 112 and includes two arrow-shaped ends to indicate at least one symbol on the first wheel or reel and on the second wheel or reel. In one embodiment, the indicator 138 is integrally formed with the second ring 112. It should be appreciated that the indicator may be positioned at any suitable location along the second ring 112. It should also be appreciated that the indicator may have any suitable size or shape. Furthermore, one or a plurality of indicators may be connected to the second ring 112. It should be appreciated that the indicator 138 may be connected to the first ring 110, the second ring 112 or at any suitable position on the display device. In an alternative embodiment, one or more illuminators such as Light Emitting Diodes (L.E.D.'s) are positioned within the receptacle or cavity formed by the first and second symbol displays and are operable to illuminate at least one of the wheel sections and reel sections of the first and second symbol displays to indicate a symbol displayed by the wheel and reel sections. It should be appreciated that any suitable light or lights may be used to indicate one or more symbols on the symbol display.

The display device is controlled by the processor as generally described above. The processor causes the display device to move or rotate to a number of different positions in conjunction with one or more game functions, game modes or attract modes. The display device is operable to display the symbols (on each of the wheels and reels) in several different positions and different orientations. This unique movement attracts players to the gaming device and also increases a player's excitement and enjoyment while playing a game associated with the gaming device. In addition, the multiple rotating members such as the symbol display, wheels and reels of the display device offers multi-faceted game play for players due to the numerous combinations of the symbols that can be displayed to the player, which further enhances a player's excitement and enjoyment of the game.

It should thus be appreciated that the display device 100 can alternatively display either wheel and the symbols on the displayed wheel, or can simultaneously display symbols on both of the reels.

Figure 5:
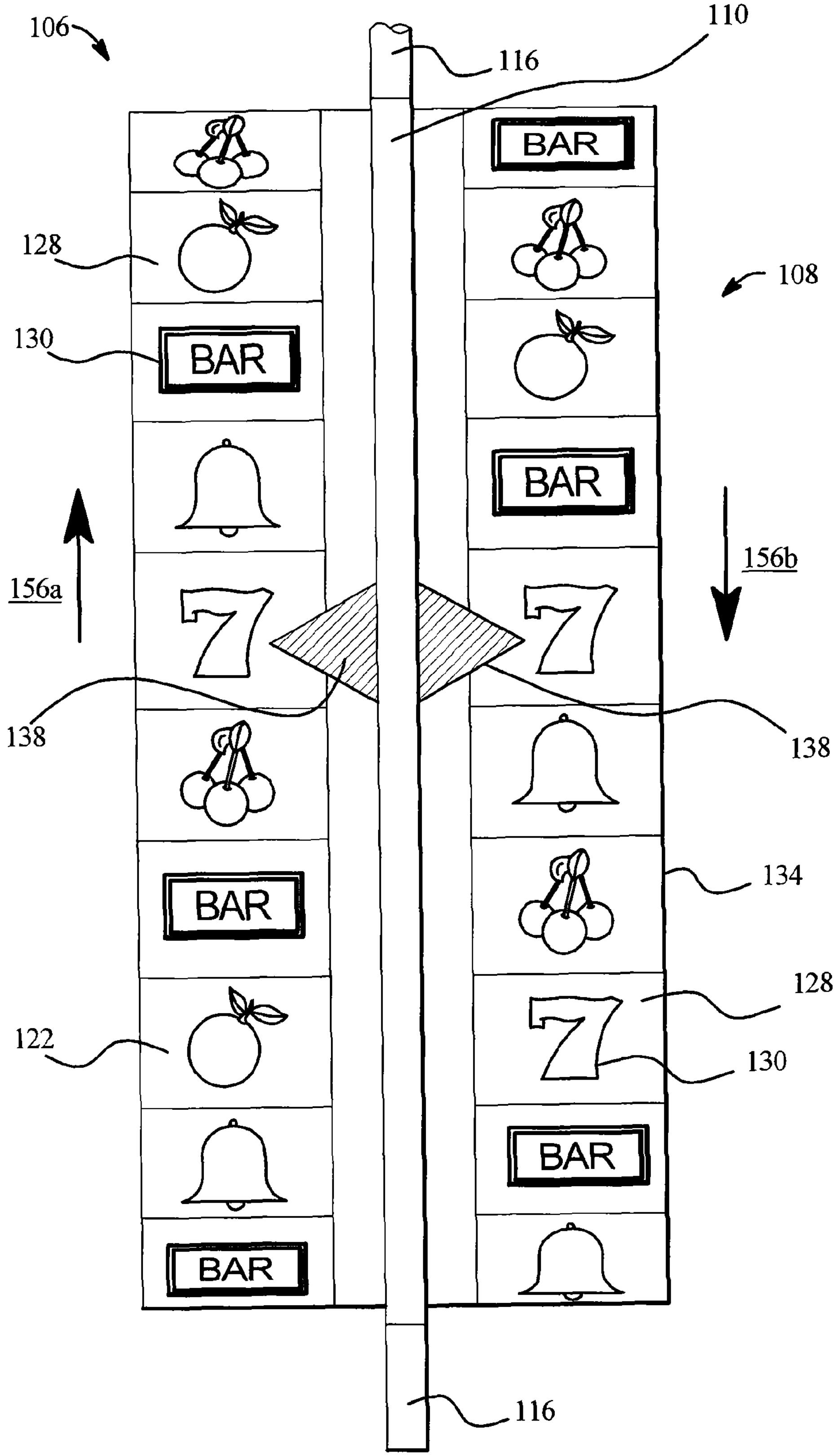
FIG. 5 is an elevation view of the display device of FIG. 3 where the display device is rotated to display the reels in a substantially vertical position.
Figure 6:
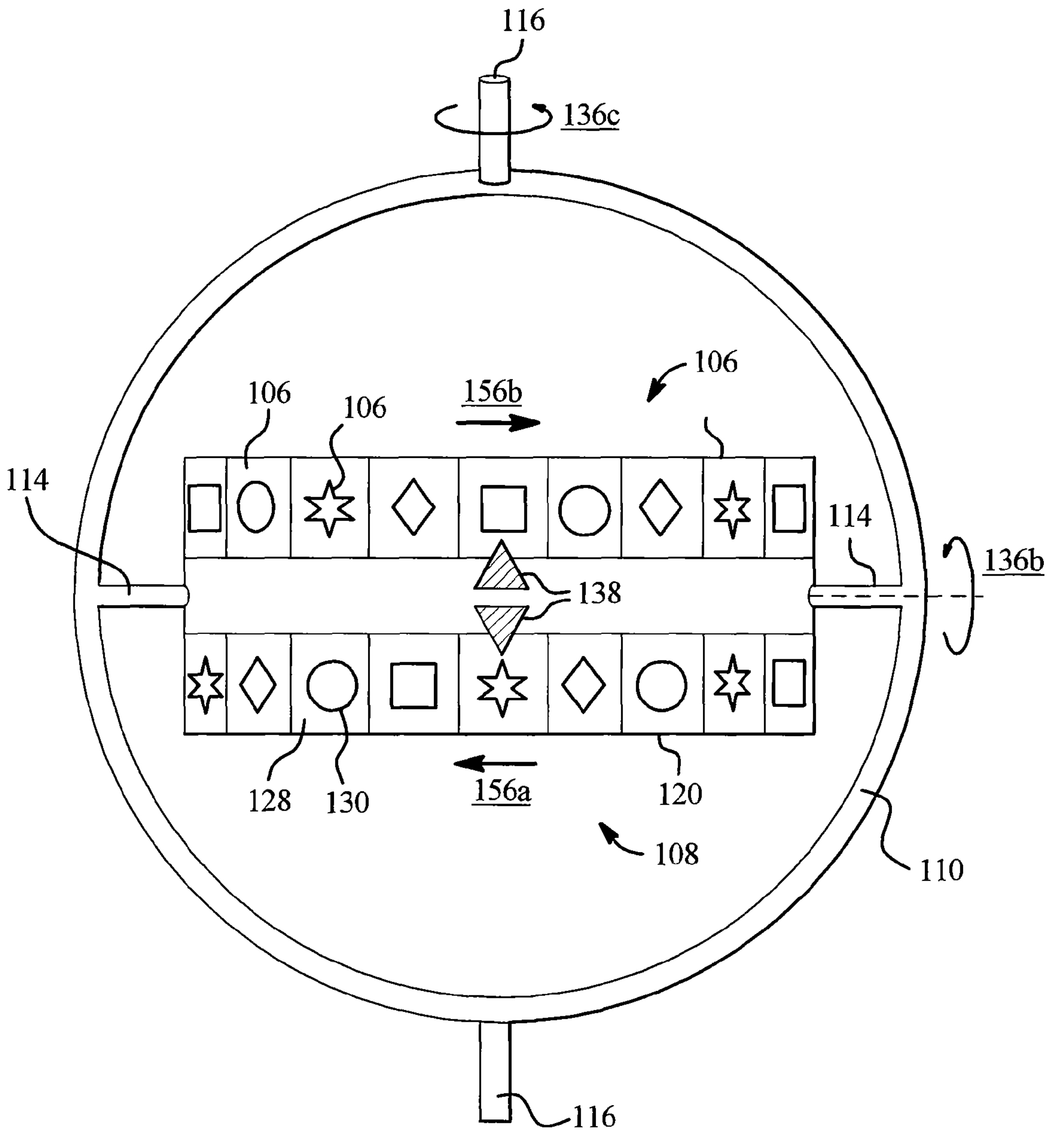
FIG. 6 is an elevation view of the display device of FIG. 3 where the display device is rotated to display the reels in a substantially horizontal position.

Referring now to FIGS. 5 and 6, the display device 100 is shown in different positions to illustrate certain of the positions for displaying symbols on the reels. In FIG. 5, the symbol display 102 is moved or rotated by the support 104 to display the first reel 122 and the second reel 134. In this position, the symbol display 102 can be used as or in conjunction with a reel game. The processor activates the motor or motors in the receptacle formed by the first and second symbol displays to cause the first and second reels to move or rotate. As shown in FIG. 5, the first reel 106 rotates upward as indicated by arrow 156*a*. The second reel 108 is moving or rotating in the opposite direction (i.e., downward) as indicated by arrow 156*a*. As described above, the processor can cause the first and second reels to move in the same direction, different directions or in any suitable combination of directions. In this embodiment, the first and second reels include conventional reel symbols such as a cherry symbol, an orange symbol, a bar symbol, a bell symbol and a seven symbol. Thus, the first and second reels 106 and 108 can be used instead of, to supplement or to replace symbols indicated by a set of reels displayed to the player by the gaming device. As shown in FIG. 5, the indicator 138 includes two arrows or pointers which simultaneously indicate one of the symbols on each of the first and second reels. For example in FIG. 5, the indicators 138 indicate a seven symbol on the first reel and a seven symbol on the second reel.

Referring now to FIG. 6, another example of the embodiment of the display device shown in FIG. 3 is illustrated where the symbol display 102 is moved or rotated to display the first and second reels 106 and 108 in a substantially horizontal position. In this embodiment, the first and second reels include symmetrical symbols such as a square, a circle, a star and a diamond which are visible whether the first and second reels are positioned in a substantially vertical position or a substantially horizontal position. The first reel 106 moves or rotates from the left to the right (as one looks at the front of the display device) as indicated by arrow 156*b*. In contrast, the second reel 108 rotates from the right to the left as indicated by arrow 156*a*. It should be appreciated that the reels can move in any suitable direction or combination of directions. An indicator 138 having two arrows or pointers indicates at least one of the symbols on each of the first and second reels. For example in FIG. 6, the indicator 138 indicates a square symbol on the first reel 106 and a star symbol on the second reel 108. This example further illustrates the variety of displays that can be presented to the player in a game and how the display device can attract players to a gaming device and enhance the player's excitement and enjoyment of a game displayed by the gaming device.

Figure 7A:
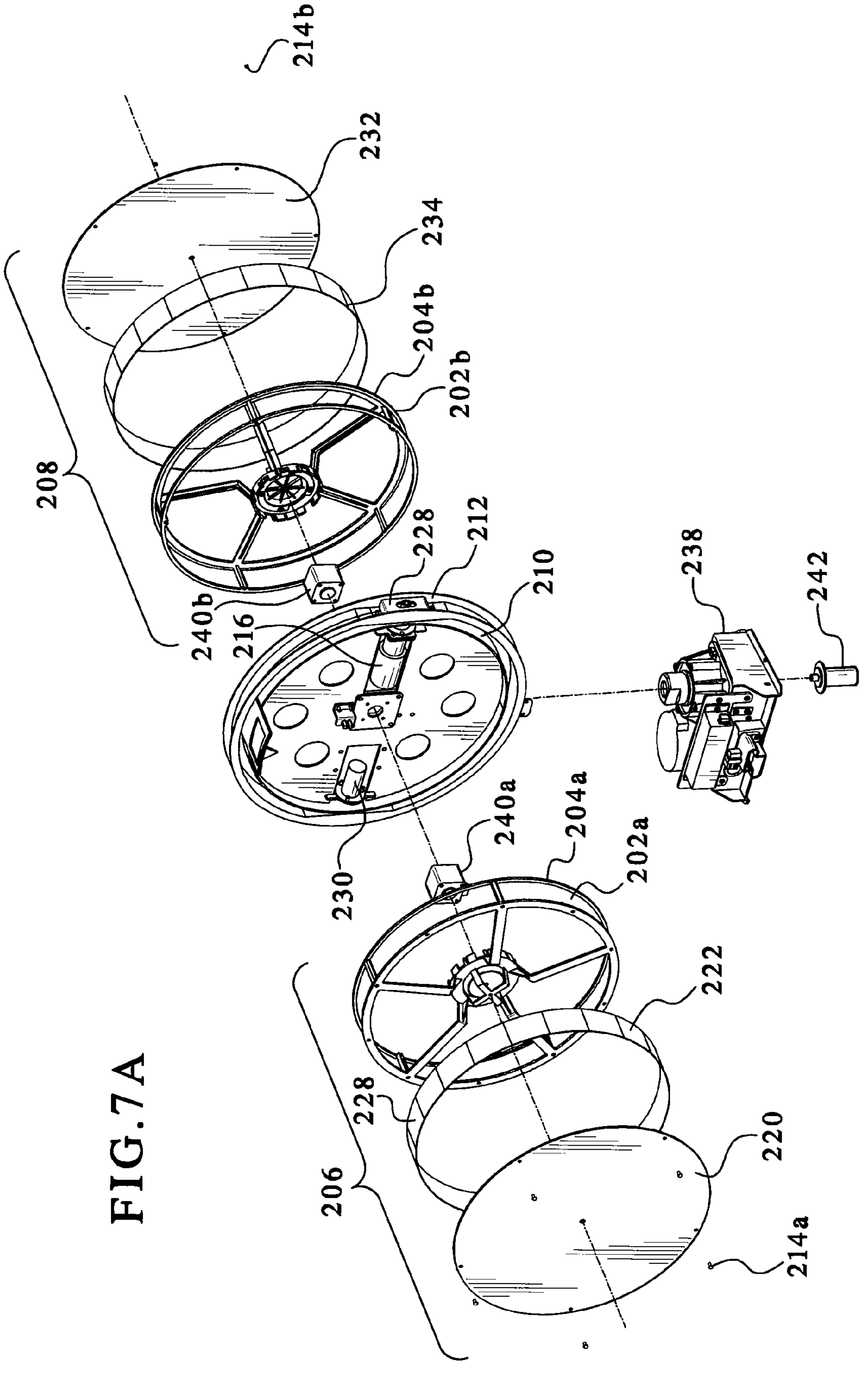
FIGS. 7A and 7B are exploded perspective views of one embodiment of the display device of the present disclosure.
Figure 7B:
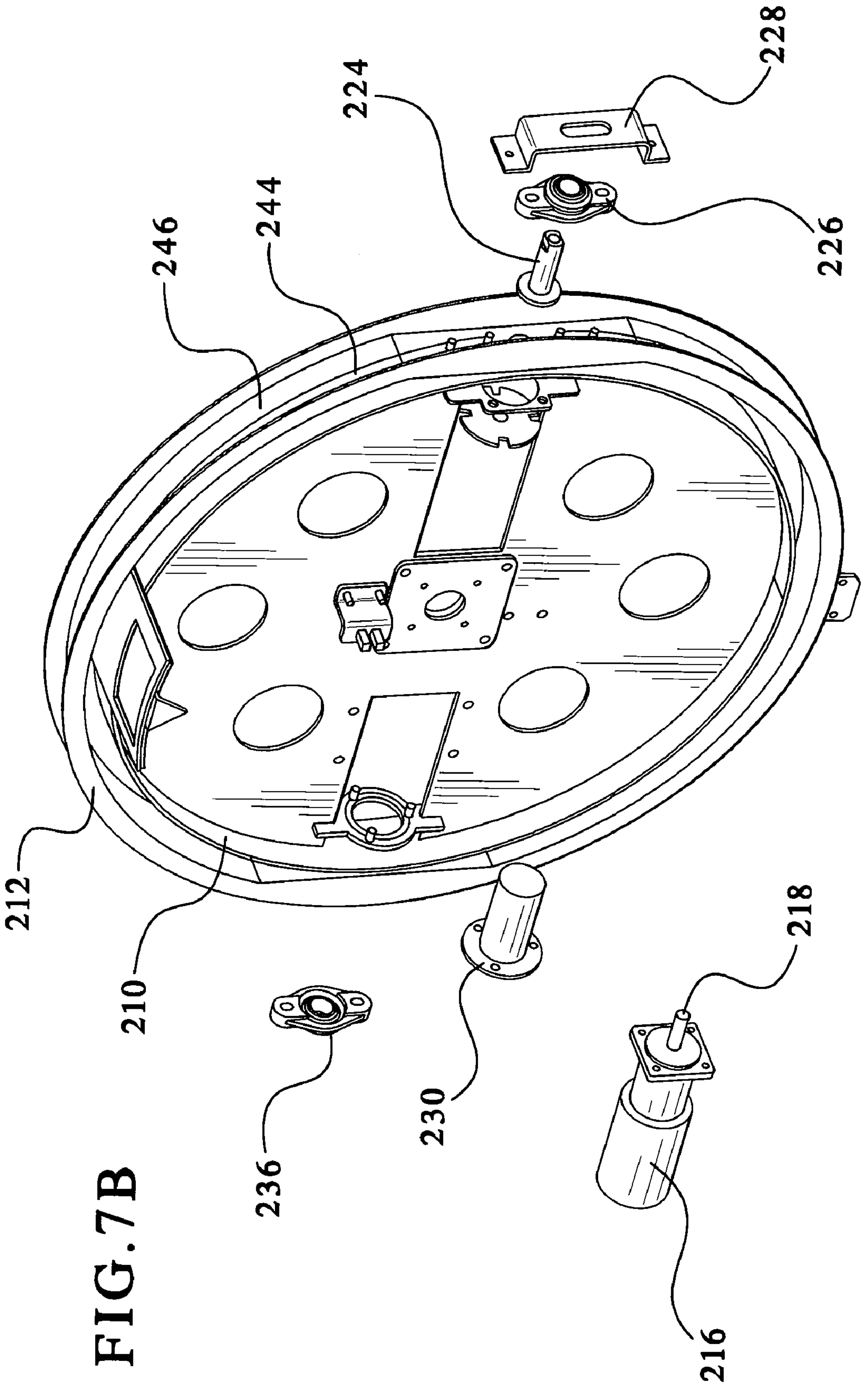

An alternative embodiment of the display device is illustrated in FIGS. 7A and 7B. In this illustrated embodiment, the front surface of the first symbol display 206 defines or includes a first wheel 220, which in one embodiment includes a plurality of wheel sections (not shown) similar to the embodiments discussed above. A side surface or edge surface of the first symbol display 206 extends substantially perpendicular to the front surface and defines or includes a first reel 222. The first reel 222 includes a plurality of reel sections 228. Each of the reel sections can include one or more reel symbols (not shown). It should be appreciated that the first reel 222 can have any suitable number of reel sections.

The first reel 222 is configured to fit onto or be coupled to a first wheel hub 202*a*. Specifically, first reel 222 is secured in grooves 204*a* along the peripheral region of the first wheel hub 202*a*. However, it should be appreciated that first reel 222 can be secured to the first wheel hub 202*a* by any suitable fastening mechanism. The first wheel 220 is secured to first wheel hub 202*a* by one or more pegs 214*a*. However, it should be appreciated that the first wheel 220 can secured to first wheel hub 202*a* using any other suitable fastening mechanism.

In the illustrated embodiment, the second symbol display 208 is identical in shape and size to the first symbol display 206 and defines or includes a second wheel 232 located on the front surface of the second symbol display 208 and a second reel 234 extending around the side of the second symbol display 208. The second wheel 232 in one embodiment includes a plurality of the wheel sections (not shown), each displaying one or more of the wheel symbols. The wheel symbols and reel symbols of the first wheel 220, first reel 222, second wheel 232 and second reel 234 can be configured in any suitable manner such as described above for the wheel symbols and reel symbols of the first wheel 120, the second wheel 132, the first reel 122, and the second reel 134.

Similar to the first symbol display 206, the second reel 234 is configured to fit onto second wheel hub 202*b*. Specifically, second reel 234 is secured in grooves 204*b* along the peripheral region of the second wheel hub 202*b*. However, it should be appreciated that second reel 234 can be secured to the second wheel hub 202*b* by any suitable fastening mechanism. The second wheel 232 is secured to second wheel hub 202*b* by one or more pegs 214*a*. However, it should be appreciated that the second wheel 232 can secured to second wheel hub 202*b* using any suitable fastening mechanism.

The first symbol display 206 is rotatably connected to a first or inner support 210. An actuator such as first motor 240*a*, which may be any suitable actuator or motor, is disposed between the first symbol display 206 and the inner support 210. The first motor 240*a* is operable to cause the first symbol display 206 to rotate clockwise or counter-clockwise. Similarly, the second symbol display 208 is also rotatably connected to the first or inner support 210. An actuator such as second motor 240*b*, which may be any suitable actuator or motor, is disposed between the second symbol display 208 and the inner support 210. The second motor 240*b* is operable to cause the second symbol display 208 to rotate clockwise or counter-clockwise. The first and second motors are activated to cause one or both of the first and second wheels and reels to move in one or more directions such as in a clockwise or counterclockwise direction. The first and second wheels and reels may be moved or rotated in any suitable direction or directions. It should be appreciated that the first and second wheels and reels may be moved at the same time or at different times. Furthermore, the first and second wheels and reels may be moved at the same rotational rate or at different rotational rates. Suitable flags and/or sensors (not shown) are used to determine and control the position of the first and second symbol displays. It should be appreciated that any suitable position detection system can be employed in the control system. Similarly, flags and sensors (not shown) or any suitable position detection systems are utilized to determine and control the position of the inner 210 and outer supports 212.

The first ring, the first member or inner support 210 and the second ring, second member or outer support 212 are concentrically arranged similar to the above described embodiments. The first ring is movably connected to the second ring so that the first and second rings can move or rotate independently of each other each about it own axis as in the embodiments described above. As described above, the first ring 210 is positioned adjacent to the first and second symbol displays 206 and 208 and supports each of the first and second symbol displays.

The first ring 210 is rotatably coupled to the second ring 212. In the illustrated embodiment, the actuator such as third motor 216 is positioned so that the axel 218 of the third motor 216 extends through the first ring 210 and the second ring 212 along the relative axis of rotation of the two rings. The axel 218 extends within a sleeve 224 which is positioned to extend through the first ring 210 and the second ring 212. The sleeve 224 extends through a brace 226 which is coupled to the second ring 212. A bracket 228 is coupled to the second ring 212 over the brace 226 to further secure the assembly. The brace 226 and bracket 228 can be secured to the second ring 212 by any suitable fastening mechanism. As a result, the axel 218 remains fixed relative to the second ring 212 and the third motor 216 can rotate relative to the axel 218, causing the first ring 210 to rotate relative to the second ring 212.

The first ring 210 is also rotatably coupled to the second ring 212 along the relative axis of rotation of the two rings opposite the third motor 216, axel 218, sleeve 224, brace 226 and bracket 228. A first slip ring 230 is coupled to the first ring 210. An axel (not shown) coupled to the first slip ring 230 extends through the first ring 210 and second ring 212. The axel can be extend within a sleeve which also extends through the first ring 210 and the second ring 212; however, it should be appreciated that the axel is not required to extend within such a sleeve. The axel or the sleeve also extends through a brace 236 which is coupled to the second ring 212. The brace 236 and first slip ring 230 can be secured to the second ring 212 and first ring 210, respectively, by any suitable fastening mechanism.

The first slip ring 230 transfers electrical power and electrical signals to the first and second motors 240*a* and 240*b* controlling the movement of the first and second display members 206 and 208. The first slip ring 230 can also transfer position signal information from sensors (not shown) for the first and second display members 206 and 208 to a controller or processor. It should be appreciated that any suitable slip ring or any suitable electrical connectors may be used to transfer the electrical power and/or electrical signals.

The second ring 212 is rotatably coupled to an actuator such as fourth motor 238. The fourth motor 238 is operable to rotate the second ring 212 (and thus the first ring 210, the first display member 206 and the second display member 208 connected to the second ring), about an axis which is perpendicular to both the relative axis of rotation between the first and second rings 210 and 212 and the axis of rotation for the first and second display members 206 and 208. It should be appreciated that in alternative embodiments, the three axes of rotation are not required to be co-perpendicular and can have any suitable relative configurations. The fourth motor 238 is also coupled to a second slip ring 242 to transfer electrical power and electrical signals, at least partly through wires 244 or other conductive materials in channel 246, to the first, second, and third motors 240*a*, 240*b*, and 216 to control the movement of the first and second display members 206 and 208 and the relative movement of the first and second rings 210 and 212. The second slip ring 242 can also transfer position signal information from the first and second display members 206 and 208 as well as the relative positions of the first and second rings 210 and 212 to a controller or processor which controls the display device. It should be appreciated that any suitable slip ring or any suitable electrical connectors may be used to transfer the electrical power and/or electrical signals.

Figure 8:
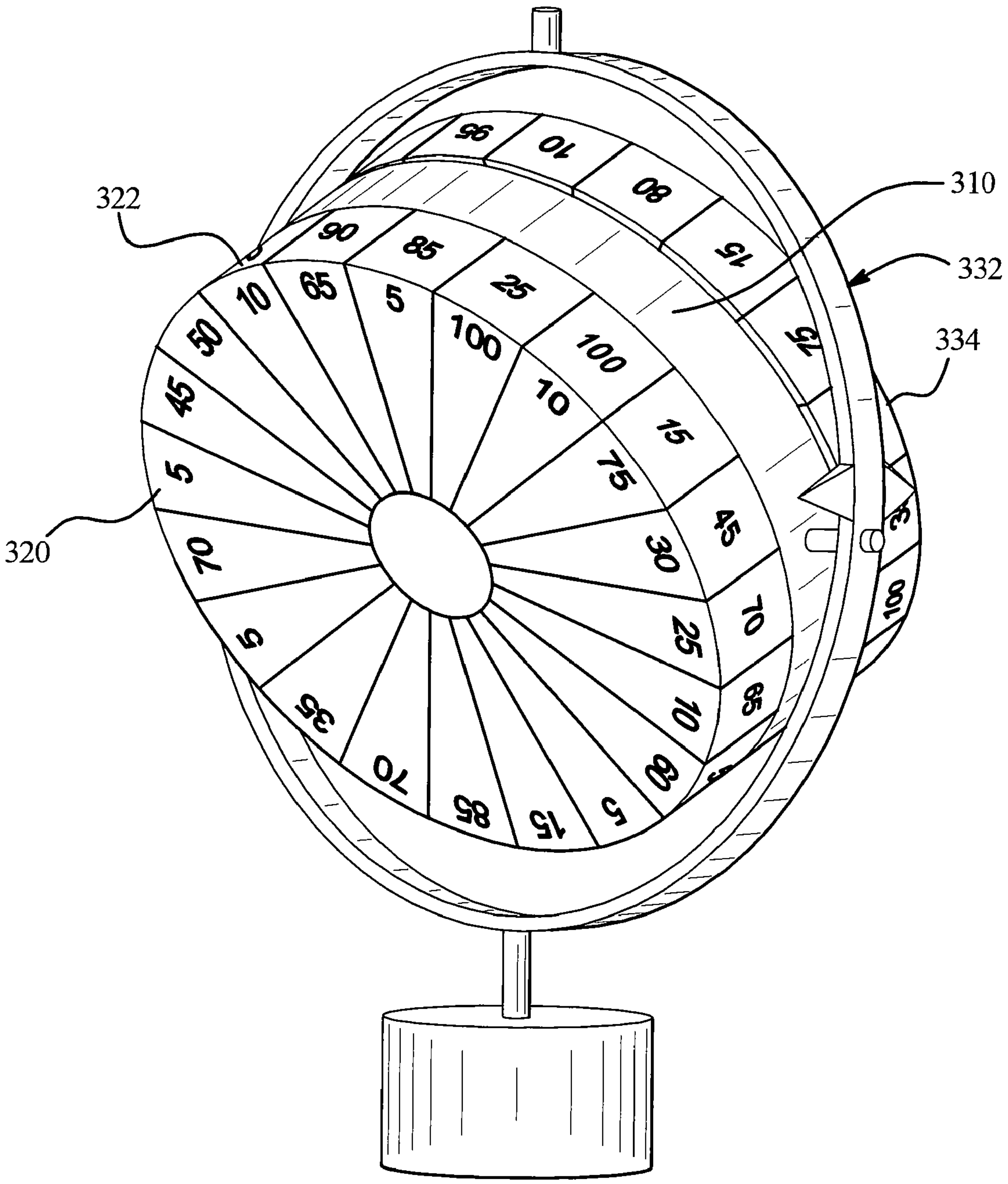
FIG. 8 is a perspective view of embodiment of the display device.

It should be appreciated that the symbols on the reel sections, which can include numbers as illustrated in FIG. 8, can be any suitable symbols and can be arranged in any suitable orientation. For example, the symbols on reel 322 are oriented with their tops positioned near the inner support 310 and their bottoms near wheel 320. The symbols on reel 334 are oriented with their tops positioned near the inner support 310 and their bottoms near wheel 332. Symbols on reel 322 and reel 334 have the same orientation as other symbols on the same reel; however, symbols on the same reel can have different relative orientations. Further, the orientations can vary by any suitable amount, such as one hundred eighty degrees, ninety degrees, forty-five degrees or any other suitable amount.

In one further alternative embodiment, one or more of the reels or wheels is associated with a concentric member or concentrically arranged member. For example, an outer reel may have a window or have at least a portion which is transparent or translucent such that a concentric inner reel of symbols is at least partly perceivable through the window or outer reel portion. The concentric inner reel is rotatable about the same axis as the outer reel and is controllable independently from the outer reel.

Similarly, an outer wheel may have a window or have at least a portion which is transparent or translucent such that a co-axial inner wheel of symbols is at least partly perceivable through the window or outer wheel portion. The co-axial inner wheel is rotatable about the same axis as the outer wheel and is controllable independently from the outer wheel.

As mentioned above, the display device can be used in several different manners. One, a plurality of or all of the multiple reels and wheels can be employed as part of or to provide part or all of:

(a) a base or primary game;
(b) a bonus or secondary game;
(c) a mystery award;
(d) a progressive award;
(e) free or discounted plays of a game;
(f) games with different denominations;
(g) games with different paytables or odds;
(h) attract modes; or
(i) any other suitable game function or feature.

In other embodiments, each of the wheels and reels could be used to provide a different game. For instance, in a server based gaming environment, one wheel could be used to provide one game and the other wheel could be used to provide another different game, as determined by the server. In certain such embodiments, upon instructions from the server, one of the wheels is displayed and one of a plurality of game programs is selected to operate the display device including that wheel. The game programs may be selected from a memory device of the gaming device or alternatively by a server (and subsequently communicated to the designated gaming device). Each game program can represents a different configuration, set of instructions or type game, executable by a gaming device processor to control the play of one or more games with the relevant portion (i.e., wheels or reels) of the display device. In different embodiments, the selected game program is determined based on a player's selection, predetermined, randomly determined, determined based on the player's wager, determined based on the player's status (such as determined through a player tracking system), determined based on a level of a jackpot award, determined based on time (such as the time of day or how long the current game program has been playing) or determined based on any other suitable criterion.

After an appropriate game program is selected, the gaming device executes the selected game program utilizing one or more of the reels and/or wheels of the display device. In one embodiment, the specific selected game program dictates the functionality and operability of the reels and/or wheels. In this embodiment, the specific selected game program dictates which symbols may be generated by the gaming device during the execution of the selected game program. As described above, since each of the reels and/or wheels include a plurality of symbols, the plurality of symbols included in (or adapted to be generated by) each of the reels and/or wheels form a fixed set of symbols. This fixed set of symbols represents the total symbols which may be used by the gaming device in the execution of the different game programs.

It should be appreciated that while one or more of the game programs may utilize (or otherwise be associated with) any of the symbols from the fixed set of symbols, one or more of the game programs may each utilize (or otherwise be associated with) different subsets of the fixed set of symbols. That is, if a game program is associated with one of the subset of symbols, only the symbols included in the subset of symbols may be generated by the gaming device during the execution of that game program.

In one embodiment, a plurality of game programs utilize different sub-sets of symbols by activating different numbers of reels and/or wheels. For example, a first selected game program utilizes reel 322 and a second selected game program utilizes reel 334. If the first game is selected, the reels are positioned with the symbols on reel 322 oriented in a right-side-up orientation as viewed by a player. As a result, the symbols on reel 334 are oriented such that the player perceives them to be upside-down. Reel 322 is then activated according to game rules to generate a symbol. In an alternative embodiment, reel 322 is oriented to have its symbols right-side-up while or after the reel 322 is activated.

Alternatively, if the second game is selected, the reels are positioned with the symbols on reel 334 oriented in a right-side-up orientation as viewed by the player. As a result, the symbols on reel 322 are oriented such that the player perceives them to be upside-down. Reel 334 is then activated according to game rules to generate a symbol. In an alternative embodiment, reel 334 is oriented to have its symbols right-side-up while or after the reel 334 is activated.

In one embodiment, at least one of the reels includes symbols that have different relative orientations. A first game utilizes only symbols that have the same relative orientation. A second game utilizes symbols that have different relative orientations. During at least some portion of the play of the first game, the reel is positioned such that the symbols to be utilized are oriented to be perceived as right-side-up, at least when they are indicated.

During at least some portion of the play of the second game, the reel is positioned so that the player can view at least some of the symbols on the reel when the reel is activated. After a symbol on the reel is generated, the reel is positioned to display the generated symbol oriented in a right-side-up orientation.

However, in another embodiment, the symbol can be displayed without ensuring its orientation is right-side-up. In one game of this embodiment, the generated symbol is utilized (e.g., awarded, used as part of a symbol combination, etc.) regardless of its orientation. In another game, the generated symbol is utilized only if it is displayed in a particular orientation (e.g., right-side-up, upside-down, sideways, etc.). In another game, the generated symbol is utilized differently when displayed in different orientations. For example, the symbol "100" when displayed right-side-up results in 100 credits being awarded to the player. However, when the symbol "100" is displayed up-side-down, it results in a maximum reduction of 100 credits for a player's award. Further, when the symbol "100" is displayed side-ways, it results in 100 credits being added to a progressive jackpot. Other suitable alternatives are in accordance with the present disclosure.

Certain operation details of a plurality of games for one embodiment are described below. These embodiments utilizes the reels and wheels shown in FIG. 8; however, it should be noted that other embodiments utilize different reels and/or wheels, including concentric reels and/or co-axial wheels, having different or differently oriented symbols, including numbers. Further, other embodiments can position the combined display device and operate the reels and/or wheels in any suitable manner in addition to those described below.

For the descriptions of the following games, the x-axis is an axis running parallel to the floor, through the center of the combined display device from the right to the left. The y-axis is an axis running perpendicular to the x-axis through the center of the combined display device from the bottom to the top. The z-axis is an axis running through the center of the combined display device perpendicular to both the x-axis and y-axis from the back to the front.

In these embodiments, the gaming device is in communication with or linked to a central server or controller to form a gaming system as described above. The central server or controller may be any suitable server or computing device which includes a processor and a memory or storage device. The central server or controller is operable to store a plurality of different executable game programs. Each game program represents a different setting, configuration or type game which may be played on one, more or each of the gaming devices in the gaming system. It should be noted that in other embodiments, the games are stored, selected and controlled locally at the gaming device.

The central controller selects the game program to be played and communicates the selected game program to the gaming device. In another embodiment, the game program is executed at the central controller rather than at the gaming device, and the gaming device is utilized to display the game program (executed by the central controller) and provide any award to the player.

The selected game program is determined based on any suitable criteria including but not limited to: a casino's selection, a player's selection, predetermined, randomly determined, determined based on the player's wager, determined based on the player's status (such as determined through a player tracking system), determined based on a level of a jackpot award, determined based on time (such as the time of day or how long the current game program has been playing).

A first game utilizes the symbols on reel 322. The combined display device is positioned such that the symbols on reel 322 are oriented right-side-up. As a result, as reel 322 is activated, the reel 322 rotates about the y-axis. When the reel 322 stops, one of the symbols on the reel 322 is indicated. In one such embodiment, a symbol is indicated by a light which differentiates the indicated symbol from other symbols on the reel 322. However, it should be noted that in other embodiments, symbols are indicated by other suitable indication devices, such as arrows or lines.

A second game utilizes the symbols on reel 334. The combined display device is positioned such that the symbols on reel 334 are oriented right-side-up. As a result, as reel 334 is activated, the reel 334 rotates about the y-axis. When the reel 334 stops, one of the symbols on the reel 334 is indicated. Similar to reel 322, a symbol is indicated by a light which differentiates the indicated symbol from other symbols on the reel 334. However, it should be noted that in other embodiments, symbols are indicated by other suitable indication devices, such as arrows or lines.

A third game utilizes the symbols on a first inner reel that is concentric with reel 322. The combined display device is positioned such that the symbols on the first inner reel are oriented right-side-up. In this embodiment, the symbols on the first inner reel have the same orientation as the symbols on reel 322; however, it should be noted that in other embodiments, one or more of the symbols on the first inner reel have orientations that differ from the symbols on reel 322. Reel 322 is rotated to position a window approximately along the z-axis so that symbols on the first inner reel are perceivable by a player through the window. When activated, the first inner reel rotates about the y-axis. When the first inner reel stops, one of the symbols on the first inner reel is indicated by being perceivable through reel 322. However, it should be noted that in other embodiments, symbols on the first inner reel are indicated by other suitable indication devices, such as lights, arrows or lines in addition to being perceivable through reel 322. It should be noted that in other versions of the game, both the first inner reel and reel 322 are activated during game play providing at least the appearance that any symbol on the first inner reel or reel 322 could be indicated.

A fourth game utilizes the symbols on a second inner reel that is concentric with reel 334. The combined display device is positioned such that the symbols on the second inner reel are oriented right-side-up. In this embodiment, the symbols on the second inner reel have the same orientation as the symbols on reel 334; however, it should be noted that in other embodiments, one or more of the symbols on the second inner reel have orientations that differ from the symbols on reel 334. Reel 334 is rotated to position a window approximately along the z-axis so that symbols on the second inner reel are perceivable by a player through the window. When activated, the second inner reel rotates about the y-axis. When the second inner reel stops, one of the symbols on the second inner reel is indicated by being perceivable through reel 334. However, it should be noted that in other embodiments, symbols on the second inner reel are indicated by other suitable indication devices, such as lights, arrows or lines in addition to being perceivable through reel 334. It should also be noted that in other versions of the game, both the second inner reel and reel 334 are activated during game play providing at least the appearance that any symbol on the second inner reel or reel 334 could be indicated.

In a fifth game, reel 322 is positioned such that it spins, when activated, about the x-axis. As in the first game, a symbol on the reel is indicated when the reel stops spinning. The indicated symbol is positioned approximately along the z-axis facing the player. Then, the combined display device is rotated about the z-axis. As a result, the indicated symbol continues to face the player, but its orientation rotates. The rotation about the z-axis is stopped, and the resulting orientation of the indicated symbol is used to determine what effect, if any, the indicated symbol has in the game.

A sixth game utilizes the symbols on wheel 320. The combined display device is positioned such that wheel 320 faces forward (i.e., towards the player), with its center approximately on the z-axis. As a result, as wheel 320 is activated, wheel 320 rotates about the z-axis. When wheel 320 stops, one of the symbols on wheel 320 is indicated. In this embodiment, a symbol is indicated by a light which differentiates the indicated symbol from other symbols on wheel 320. However, it should be noted that in other embodiments, symbols are indicated by other suitable indication devices, such as arrows or lines.

A seventh game utilizes the symbols on wheel 332. The combined display device is positioned such that wheel 332 faces forward, with its center approximately on the z-axis. As a result, as wheel 332 is activated, wheel 332 rotates about the z-axis. When wheel 332 stops, one of the symbols on wheel 332 is indicated. Similar to wheel 320, a symbol is indicated by a light which differentiates the indicated symbol from other symbols on wheel 332. However, it should be noted that in other embodiments, symbols are indicated by other suitable indication devices, such as arrows or lines.

An eighth game utilizes the symbols on an inner wheel that is co-axial with wheel 332. The inner wheel and wheel 332 are positioned to face forward with their centers approximately on the z-axis. In one version, the symbols on the inner wheel are oriented similarly to the symbols on wheel 332 (i.e., so that they are right-side-up when at the top of wheel 332). In this version, a window in wheel 332, through which a player can perceive the symbols on the inner wheel, is positioned at the top of the wheel. However, in other versions, one or more of the symbols on the inner wheel have orientations that differ from the symbols on wheel 332. In these other versions, the window of wheel 332 may be positioned differently (e.g., at the bottom or on a side) so that the symbol indicated on the inner wheel is displayed right-side-up. When activated, the inner wheel rotates about the z-axis. When the inner wheel stops, one of the symbols on the inner wheel is indicated by being perceivable through wheel 332. However, it should be noted that in other embodiments, symbols on the inner wheel are indicated by other suitable indication devices, such as lights, arrows or lines in addition to being perceivable through wheel 332.

Various other games utilize two or more of the wheels and/or reels of the combined display device. For example, in a ninth game, reel 322 and reel 334 are positioned such that they spin, when activated, about the x-axis. A first symbol on reel 322 is indicated when reel 322 stops spinning, and a second symbol on reel 334 is indicated when reel 334 stops spinning. The indicated symbols are positioned approximately along the z-axis facing the player. Then, the combined display device is rotated about the z-axis. As a result, the indicated symbols continue to face the player, but their orientation rotates. The rotation about the z-axis is stopped, and the resulting orientation of the indicated symbols is used to determine what effect, if any, the indicated symbols have in the game. In one version, only a symbol oriented right-side-up has an effect in the game. In another version, the rotation about the z-axis is always stopped such that one of the indicated symbols is oriented right-side-up.

In a tenth game, reel 322 and wheel 320 are activated. As reel 322 and wheel 320 spin, the combined display device alternates between a first orientation and a second orientation. In the first orientation, wheel 320 faces front, and reel 322 is not perceivable by the player. In the second orientation, reel 322 is perceivable by a player with the symbols of reel 322 oriented right-side-up, and wheel 320 is not perceivable by the player. If reel 322 and wheel 320 stop spinning and the combined display device is in the first orientation, a symbol from wheel 320 is indicated. If the combined display device is in the second orientation, a symbol from reel 322 is indicated.

In an eleventh game, reel 322 and reel 334 are positioned so that they rotate approximately about the x-axis when activated, and both reel 322 and reel 334 are activated. A first symbol is indicated on reel 322 and a second symbol is indicated on reel 334. Both symbols are utilized to determine an outcome for a player with or without regard to their orientations.

In various other games, symbols are sequentially selected from one or more of the wheels and/or reels of the combined display device. For example, in a twelfth game, a first symbol is indicated on reel 322 in a manner similar to the first game. Then, a second symbol is indicated on reel 334 in a manner similar to the second game. The first and second symbol are used to determine an award, if any, for the player. In one version of the game, the first symbol indicates an award amount and the second symbol indicates a multiplier for that award amount. It should be understood that in other versions of the game, the first and second symbols are used to determine an award, if any, in other suitable ways.

Further, it should be understood that the various other games are available for play with this embodiment. It should also be understood that other games are available for play with other embodiments having different numbers of reels, wheels, concentric reels and/or co-axial wheels; different numbers of segments on the reels, wheels, concentric reels and/or co-axial wheels; different symbols on the reels, wheels, concentric reels and/or co-axial wheels; and/or different orientations of the symbols on the reels, wheels, concentric reels and/or co-axial wheels.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operable under control of a processor, said gaming device comprising:

a cabinet;

a support movably connected to the cabinet, said support including an inner support rotatable about a first axis and an outer support rotatable about a second different axis, said inner support being rotatably connected to said outer support, and a first symbol display connected to said inner support, said first symbol display including a first wheel portion and a first reel portion, said first reel portion extending transversely from the first wheel portion, and each of said first wheel portion and first reel portion including a plurality of symbols, said first symbol display being rotatable about a third axis, wherein said third axis is different from said first axis and said second axis, wherein the processor is programmed to: (a) control a game operable upon a wager by a player; (b) cause said inner support to move about said first axis; (c) cause said outer support to move about said second axis; and (d) cause said first wheel portion and first reel portion to move to display at least one of the symbols of said first wheel portion or said first reel portion.

2. The gaming device of claim 1, wherein the first axis extends substantially horizontally and said second axis extends substantially vertically.

3. The gaming device of claim 1, wherein the first axis extends substantially vertically and said second axis extends substantially horizontally.

4. The gaming device of claim 1, wherein said inner and outer supports include substantially circular rings.

5. The gaming device of claim 1, wherein said first symbol display has a front surface that includes the first wheel portion and a side surface that includes the first reel portion.

6. The gaming device of claim 1, which includes a second symbol display connected to said inner support, said second symbol display including a second wheel portion and a second reel portion, said second reel portion extending transversely from the second wheel portion, and each of said second wheel portion and second reel portion including a plurality of symbols, wherein the processor is programmed to: (a) cause said inner support to move about said first axis; (b) cause said outer support to move about said second axis, and (c) cause:

(i) said first wheel portion to move to display at least one of the symbols on said first wheel portion, (ii) said second wheel portion to move to display at least one of the symbols on said second wheel portion;

(iii) said first reel portion to move to display at least one of the symbols on said first reel portion, or (iv) said second reel portion to move to display at least one of the symbols on said second reel portion.

7. The gaming device of claim 6, wherein said second symbol display has a front surface that includes the second wheel portion and a side surface that includes the second reel portion.

8. The gaming device of claim 6, which is configured such that (a) at least one of said symbols of said first wheel portion and said second wheel portion is different from said symbols on said first reel portion and said second reel portion;

(b) a plurality of said symbols on said first wheel portion and said second wheel portion are different from said symbols on said first reel portion and said second reel portion; or (c) all of said symbols on said first wheel portion and said second wheel portion are different from said symbols on said first reel portion and said second reel portion.

9. The gaming device of claim 6, wherein at least one of said symbols on said first wheel portion is different from said symbols on said second wheel portion.

10. The gaming device of claim 6, wherein a plurality of said symbols on said first wheel portion are different from said symbols on said second wheel portion.

11. The gaming device of claim 6, wherein all of said symbols on said first wheel portion are different from said symbols on said second wheel portion.

12. The gaming device of claim 6, wherein said second symbol display is rotatable about the third axis relative to said inner support.

13. The gaming device of claim 1, wherein at least one of said symbols on each of said wheel portions and reel portions is different.

14. The gaming device of claim 1, wherein a plurality of said symbols on each of said wheel portions and reel portions are different.

15. The gaming device of claim 1, wherein all of said symbols on said wheel portions and reel portions are different.

16. The gaming device of claim 1, which includes at least one actuator connected to each of said inner and outer supports.

17. The gaming device of claim 1, which includes an indicator connected to said inner support, wherein said indicator is configured to indicate at least one of the symbols on at least one of said first wheel portion and first reel portion.

18. A gaming device operable under control of a processor, said gaming device comprising:

a support including an inner support and an outer support, wherein the inner support is rotatably connected to the outer support, said inner support configured to rotate about a first axis and said outer support configured to rotate about a second axis;

a first symbol display movably connected to said inner support and a second symbol display movably connected to said inner support, said first symbol display including a first wheel portion and a first reel portion, said first wheel portion including a plurality of first wheel symbols and said first reel portion including a plurality of first reel symbols, said second symbol display including a second wheel portion and a second reel portion, said second wheel portion including a plurality of second wheel symbols and said second reel portion including a plurality of second reel symbols; and at least one indicator connected to said inner support and positioned to indicate at least one of the first wheel symbols, the second wheel symbols, the first reel symbols and the second reel symbols, wherein the processor is programmed to cause the inner and outer supports to rotate to cause at least one of the first and second symbol displays to rotate relative to the inner support, and to cause at least one of:

(a) said first wheel portion and said first reel portion to move, and (b) said second wheel portion and said second reel portion to move, to indicate at least one of the symbols on said first wheel portion or said second wheel portion, or to indicate one symbol on each of said reel portions with said indicator.

19. The gaming device of claim 18, wherein the first axis extends substantially horizontally and said second axis extends substantially vertically.

20. The gaming device of claim 18, wherein the first axis extends substantially vertically and said second axis extends substantially horizontally.

21. The gaming device of claim 18, wherein said inner and outer supports includes substantially circular rings.

22. The gaming device of claim 18, wherein at least one of said symbols on said first wheel portion and said second wheel portion is different from said symbols on said first reel portion and said second reel portion.

23. The gaming device of claim 18, wherein a plurality of said symbols on said first wheel portion and said second wheel portion are different from said symbols on said first reel portion and said second reel portion.

24. The gaming device of claim 18, wherein all of said symbols on said first wheel portion and said second wheel portion are different from said symbols on said first reel portion and said second reel portion.

25. The gaming device of claim 18, wherein at least one of said symbols on said first wheel portion is different from said symbols on said second wheel portion.

26. The gaming device of claim 18, wherein a plurality of said symbols on said first wheel portion are different from said symbols on said second wheel portion.

27. The gaming device of claim 18, wherein all of said symbols on said first wheel portion are different from said symbols on said second wheel portion.

28. The gaming device of claim 18, wherein at least one of said symbols on each of said first and second wheel portions and said first and second reel portions is different.

29. The gaming device of claim 18, wherein a plurality of said symbols on each of said first and second wheel portions and said first and second reel portions are different.

30. The gaming device of claim 18, wherein all of said symbols on said first and second wheel portions and said first and second reel portions are different.

31. The gaming device of claim 18, which includes at least one actuator connected to each of said inner and outer supports.

32. The gaming device of claim 18, which includes a plurality of indicators connected to said inner support, wherein said indicator is configured to indicate at least one of said symbols on at least one of said first and second wheel portions and said first and second reel portions.

33. A gaming device comprising:

a housing;

an outer support connected to the housing and rotatable relative to the housing about a first axis;

an inner support connected to the outer support and rotatable relative to the outer support about a second axis, said second axis being different from the first axis;

a first symbol display including a plurality of symbols, said first symbol display connected to the inner support and rotatable relative to the inner support about a third axis, said third axis being different from the second axis;

an indicator; and a processor programmed to cause the outer support to rotate relative to the housing, the inner support to rotate relative to the outer support, the first symbol display to rotate relative to the inner support, and the indicator to indicate at least one of plurality of symbols.

34. The gaming device of claim 33, which includes a second symbol display including a second plurality of symbols, wherein the second symbol display is connected to the inner support.

35. The gaming device of claim 34, wherein the second symbol display is rotatable relative to the inner support about the third axis, and wherein the processor is programmed to cause the second symbol display to rotate relative to the inner support.

36. The gaming device of claim 35, wherein the processor is programmed to increase, decrease, reverse and stop the rotation of the outer support relative to the housing, the inner support relative to the outer support, the first symbol display relative to the inner support, and second symbol display is rotatable relative to the inner support.

37. The gaming device of claim 33, wherein the first symbol display includes a wheel portion and a reel portion, wherein the wheel portion includes one or more wheel sections, wherein the reel portion includes one or more reel sections, and wherein the plurality of symbols includes one or more wheel symbols displayed on the one or more wheel sections and one or more reel symbols displayed on the one or more reel sections.

38. The gaming device of claim 37, wherein a border between a first reel section and a second reel section is co-planar with a border between a first wheel section and a second wheel section.

39. The gaming device of claim 33, wherein the first symbol display includes a first reel having a first plurality of reel sections and a second reel having a second plurality of reel sections, the first and second reel being concentric, a first reel section of the first plurality of reel sections including a first symbol of the plurality of symbols, a second reel section of the second plurality of reels including a second symbol of the plurality of reels, and the second symbol of the second reel section being perceivable through a third reel section of the first plurality of reel sections.

40. A gaming device operable under control of a processor, said gaming device comprising:

a cabinet;

a support movably connected to the cabinet, said support including an inner support rotatable about a first axis and an outer support rotatable about a second different axis, said inner support being rotatably connected to said outer support; and a first symbol display connected to said inner support, said first symbol display including a first wheel portion and a first reel portion, said first reel portion extending transversely from the first wheel portion, and each of said first wheel portion and first reel portion including a plurality of symbols, said first symbol display being rotatable about a third axis, wherein said third axis is different from said first axis and said second axis, wherein the processor is programmed to:

(a) cause said inner support to move about said first axis;

(b) cause said outer support to move about said second axis;

(c) position said first wheel portion to display a first game in response to a first instruction received from a remote server; and (d) position said first reel portion to display a second different game in response to a second different instruction received from the remote server.

41. The gaming device of claim 40, wherein the first axis extends substantially horizontally and said second axis extends substantially vertically.

42. The gaming device of claim 40, wherein the first axis extends substantially vertically and said second axis extends substantially horizontally.

43. The gaming device of claim 40, wherein said inner and outer supports include substantially circular rings.

44. The gaming device of claim 40, which includes a second symbol display connected to said inner support, said second symbol display including a second wheel portion and a second reel portion, said second reel portion extending transversely from the second wheel portion, and each of said second wheel portion and second reel portion including a plurality of symbols, wherein the processor is programmed to: (a) cause said inner support to move about said first axis; (b) cause said outer support to move about said second axis; and (c) position said second wheel portion to display a third game in response to a third different instruction received from the remote server.

45. A gaming device operable under control of a processor, said gaming device comprising:

a cabinet;

a support movably connected to the cabinet, said support including an inner support rotatable about a first axis and an outer support rotatable about a second different axis, said inner support being rotatably connected to said outer support; and a first symbol display connected to said inner support, said first symbol display including a first wheel portion and a first reel portion, said first reel portion extending transversely from the first wheel portion, and each of said first wheel portion and first reel portion including a plurality of symbols, said first symbol display being rotatable about a third axis, wherein said third axis is different from said first axis and said second axis; and a second symbol display connected to said inner support, said second symbol display including a second wheel portion and a second reel portion, said second reel portion extending transversely from the second wheel portion, and each of said second wheel portion and second reel portion including a plurality of symbols, wherein the processor is programmed to:

(a) cause said inner support to move about said first axis;

(b) cause said outer support to move about said second axis;

(c) position said first wheel portion to display a first game in response to a first instruction received from a remote server; and (d) position said first reel portion to display a second different game in response to a second instruction received from the remote server;

(e) position said second reel portion to display the second game in response to said second different instruction received from the remote server; and (f) position said second wheel portion to display a third different game in response to a third different instruction received from the remote server.

46. The gaming device of claim 45, wherein the first axis extends substantially horizontally and said second axis extends substantially vertically.

47. The gaming device of claim 45, wherein the first axis extends substantially vertically and said second axis extends substantially horizontally.

48. The gaming device of claim 45, wherein said inner and outer supports include substantially circular rings.

49. The gaming device of claim 45, wherein said first symbol display has a front surface that includes the first wheel portion and a side surface that includes the first reel portion.

* * * * *

UNITED STATES PATENT AND TRADEMARK OFFICE

CERTIFICATE OF CORRECTION

PATENT NO. : 7,862,422 B2
APPLICATION NO. : 11/470167
DATED : January 4, 2011
INVENTOR(S) : Garamendi et al.

It is certified that error appears in the above-identified patent and that said Letters Patent is hereby corrected as shown below:

In the Claims:

In Claim 6, column 26, line 19, replace the ";" with a ",".

In Claim 45, column 30, line 8, delete "and".

Signed and Sealed this
Eighth Day of March, 2011

David J. Kappos

David J. Kappos
*Director of the United States Patent and Trademark Office*